June 13, 1944.    O. W. WILSON ET AL    2,351,088
FILM HANDLING APPARATUS
Filed Sept. 21, 1940    10 Sheets-Sheet 1

INVENTORS.
OLIVER WHITWELL WILSON
WARREN DUNHAM FOSTER
BY
ATTORNEY.

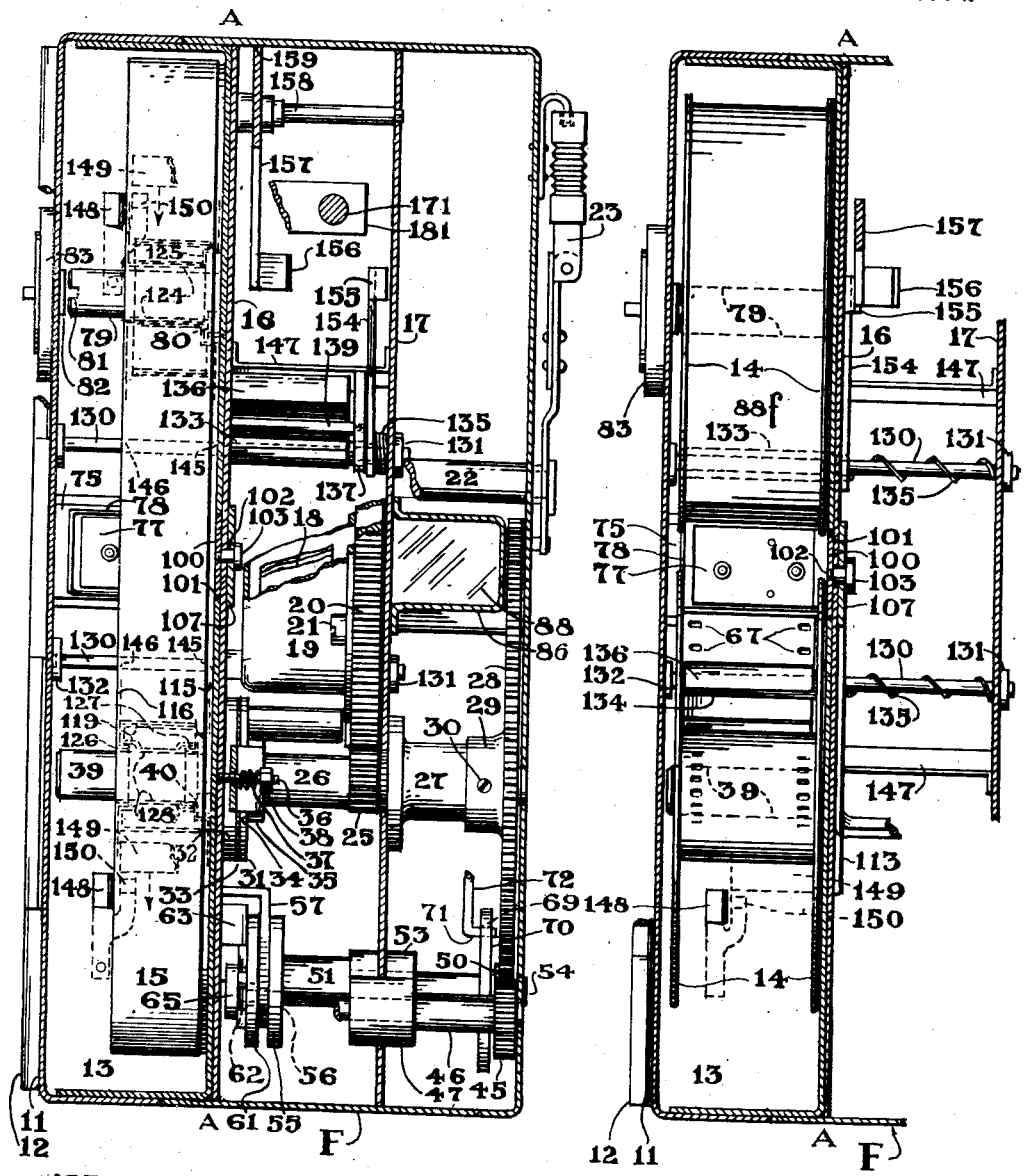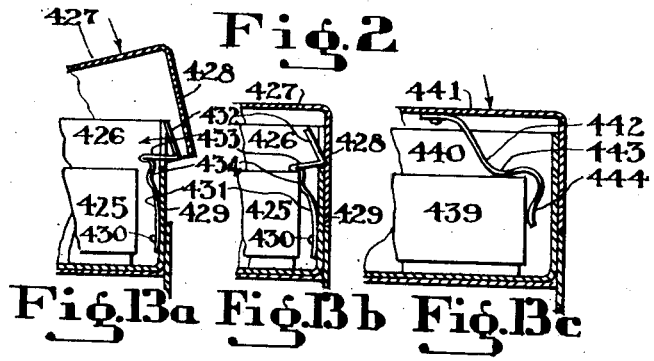

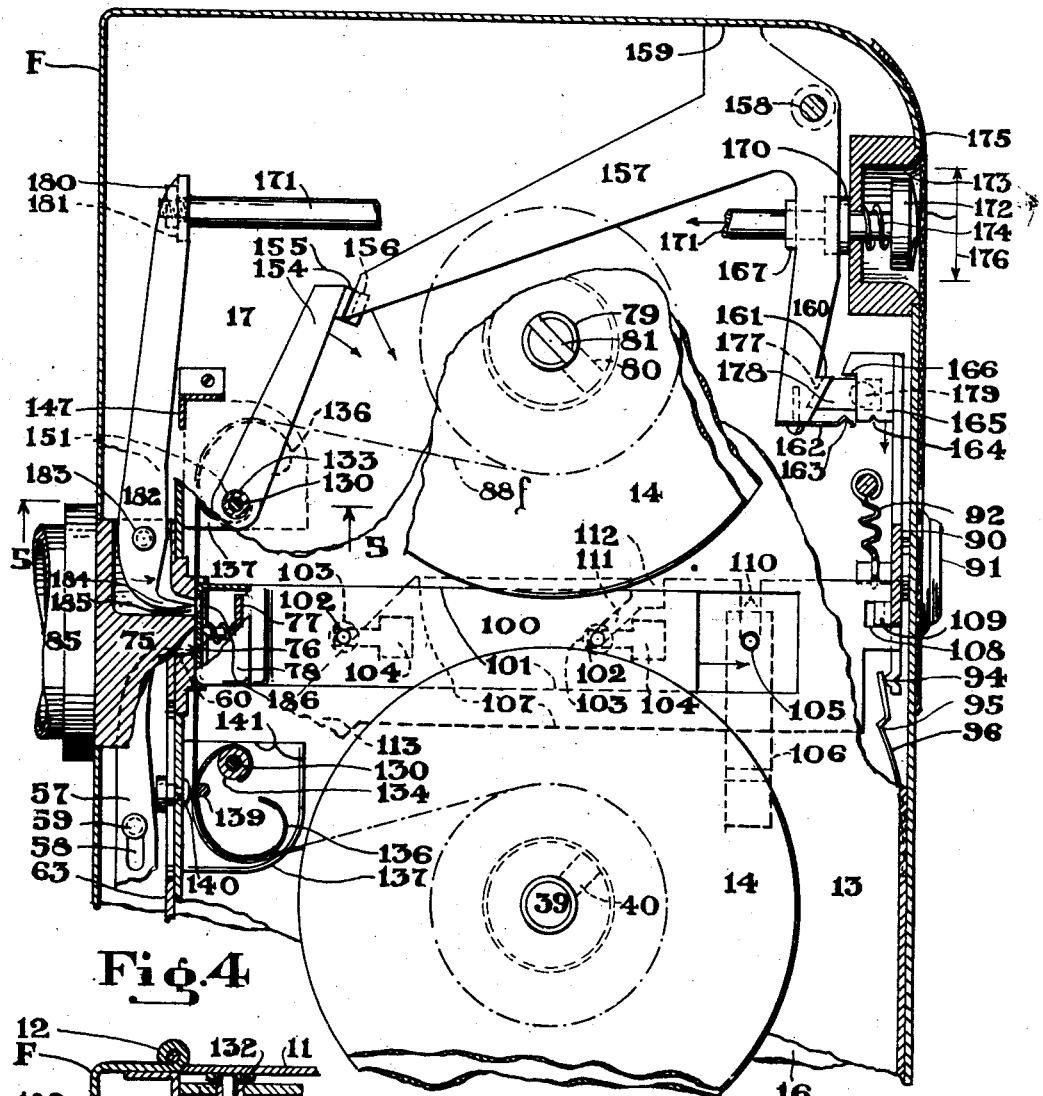

June 13, 1944.  O. W. WILSON ET.AL  2,351,088
FILM HANDLING APPARATUS
Filed Sept. 21, 1940  10 Sheets-Sheet 4

INVENTORS.
OLIVER WHITWELL WILSON
WARREN DUNHAM FOSTER
BY
ATTORNEY

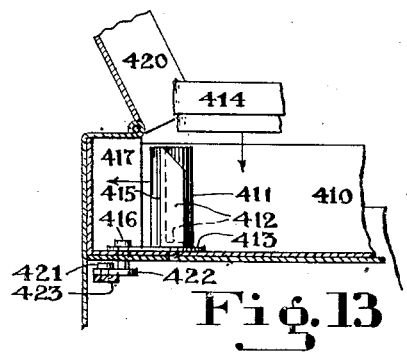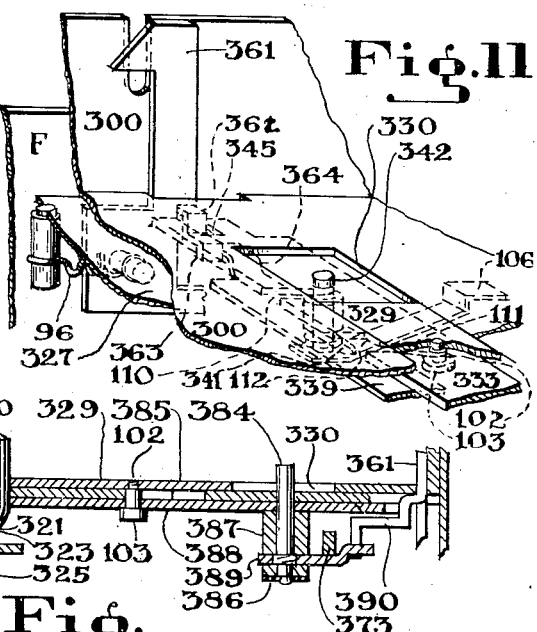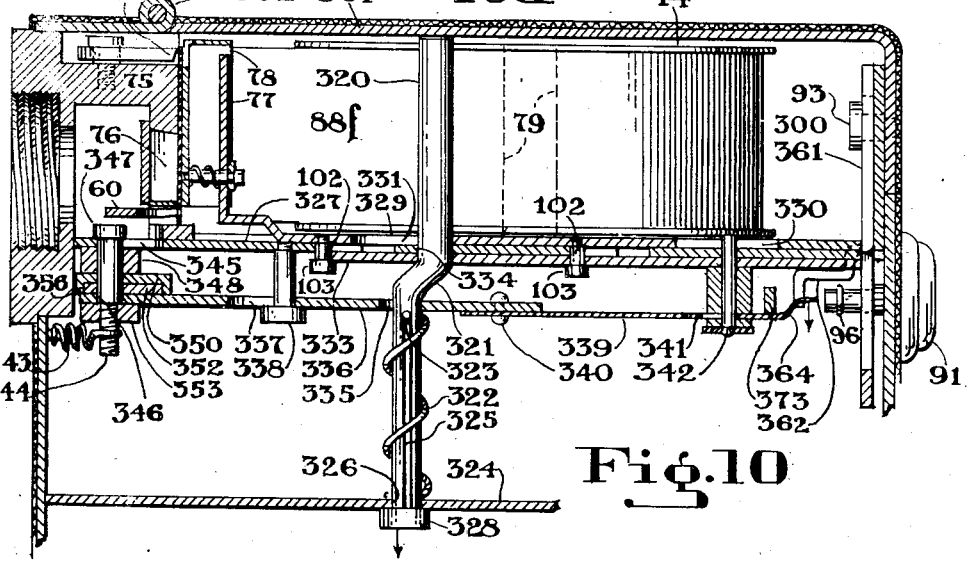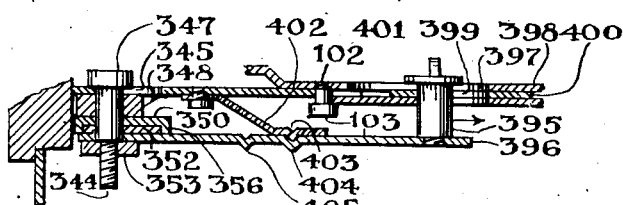

INVENTORS.
OLIVER WHITWELL WILSON
WARREN DUNHAM FOSTER
BY
Warren Dunham Foster
ATTORNEY.

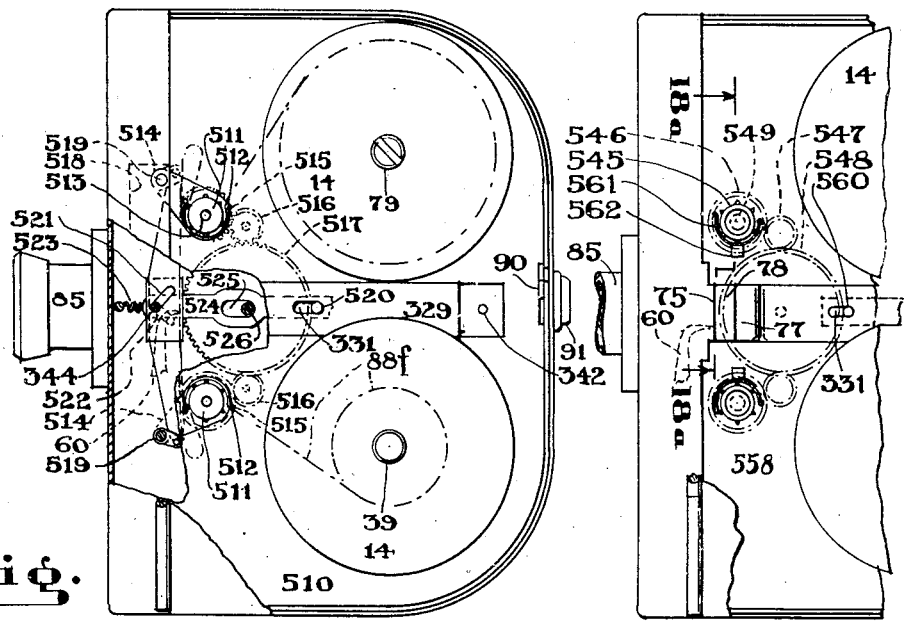
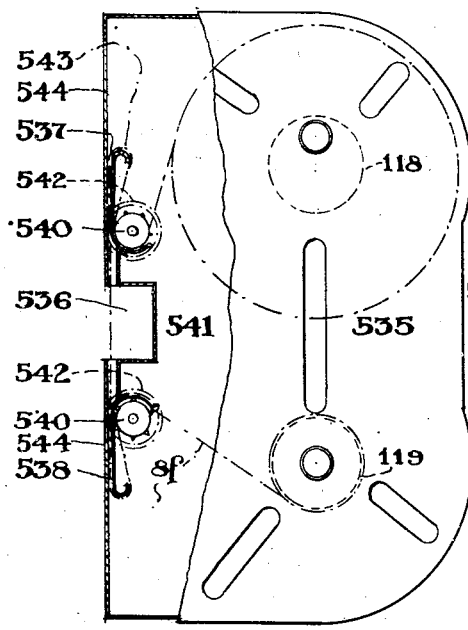
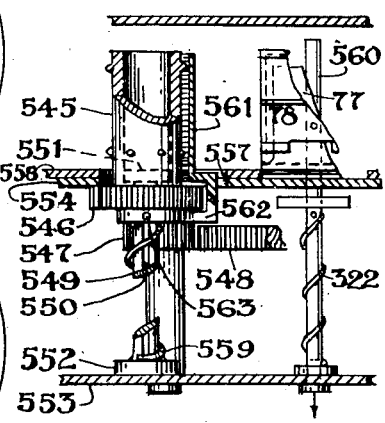

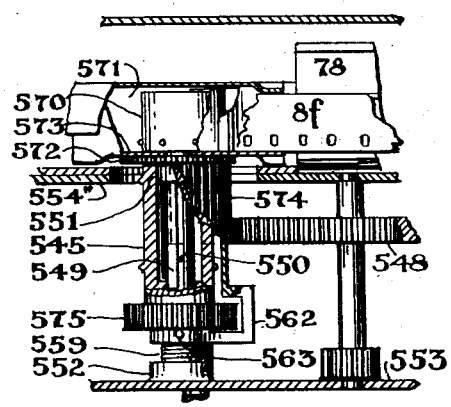
Fig.18b
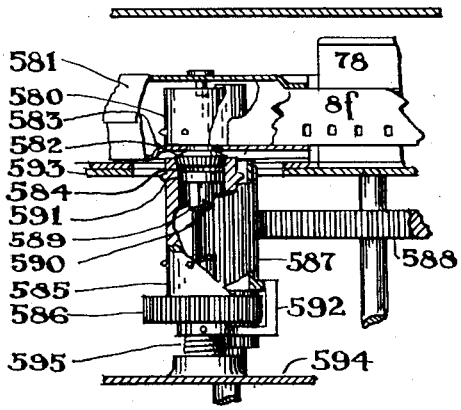
Fig.19
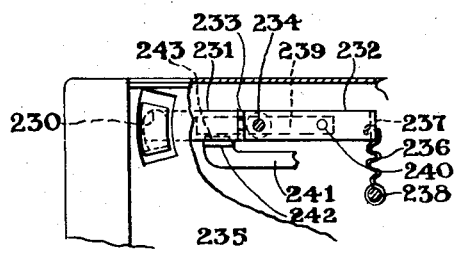
Fig.6a
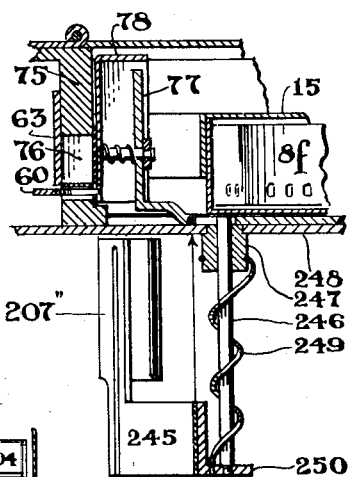
Fig.7b
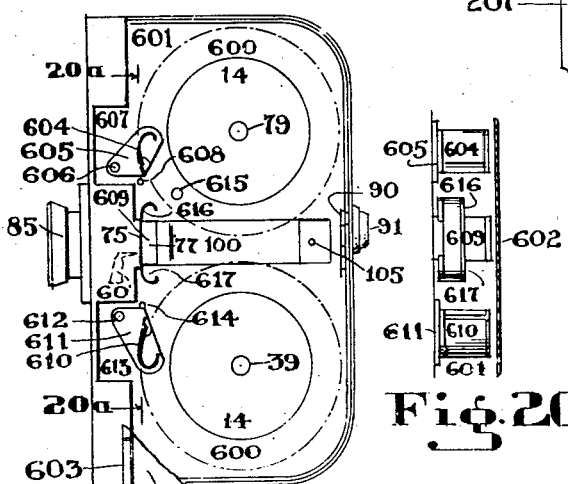
Fig.20a
Fig.20
INVENTORS.
OLIVER WHITWELL WILSON
WARREN DUNHAM FOSTER
BY
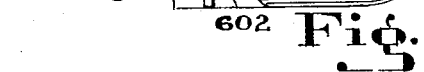
ATTORNEY

INVENTORS.
OLIVER WHITWELL WILSON
WARREN DUNHAM FOSTER
BY
ATTORNEY.

Patented June 13, 1944

2,351,088

UNITED STATES PATENT OFFICE 2,351,088

FILM HANDLING APPARATUS

Oliver Whitwell Wilson, New York, N. Y., and Warren Dunham Foster, Washington Township, Bergen County, N. J.; said Wilson assignor to said Foster Application September 21, 1940, Serial No. 357,802

88 Claims. (Cl. 88—18)

Our invention is particularly useful to amateur users of motion pictures, but its utility is not so limited. Our invention is illustrated as applied to a camera, but it can be used in apparatus for the projection or printing of pictures or for the recording or reproduction of sound either alone or in connection with motion pictures. As is known to those skilled in this art, for most effective use by an amateur, or indeed by a professional, films are preferably contained in separate relatively inexpensive magazines which are loaded at their factories by the suppliers of the films. The user merely opens his camera and drops one of these magazines into the compartment therein which is made to receive it. Upon the subsequent closing and latching of the cover, in the most advanced apparatus, the film is thereupon ready for exposure or projection without any handling or manipulation. After the film has been exposed (or projected if in a projector) or, indeed, before complete exposure, the photographer can take this magazine out of his camera and instantly replace it with another. Apparatus making use of magazines have enjoyed wide commercial success throughout the world.

The only objection seriously urged against this type of apparatus is that the magazines may not be universally obtainable and the user may at times find himself in a locality in which he cannot purchase a fresh supply. Also, certain types of films have not in the past been made readily available in magazines although widely sold upon open reels.

A primary purpose of our invention is to provide an apparatus which will accommodate interchangeably and alternatively either a film supported within a magazine or one supported upon an open reel thus providing in one apparatus opportunity for enjoying the advantages of both types without the disadvantages of either. In an apparatus constructed according to this invention the user without any manipulation whatever or handling of loose parts or other trouble or the exercise of any skill may employ either type of film carrier. No matter which type he uses all that he need do is to place a carrier of either type within the apparatus and proceed exactly as he would do if he were using a conventional camera built to accommodate only the particular type of carrier which he was then employing.

One of the chief objections to the use of a film mounted upon an open reel and not in a magazine is that the user must thread the film by hand into operative relation with the various film engaging parts of the apparatus and must by hand attach the leading end to a take-up carrier. It is obviously impossible completely to overcome these difficulties in any apparatus in which an open reel is used, but they are greatly lessened when the Bundick and Proctor tension control system of feeding is employed. A primary object of this invention is to apply this system to apparatus of the combination or duplex type above described, and another and a related object is to provide certain improvements in this system of feeding. In motion picture apparatus of the type commonly employed, the section of the film at the point of exposure or projection moves intermittently (normally at a rate of sixteen or twenty-four cycles per second) while it is being fed from and to continuously moving delivery and take-up masses. According to the Bundick and Proctor system, as disclosed and broadly claimed in their United States Patent Number 1,944,022 applied for July 18, 1925, and issued January 16, 1934, compensation for this difference in the character of the movement is provided by the application of carefully regulated resilient pressure between the continuously moving masses upon the delivery and take-up carriers respectively and the section of the film which moves intermittently at the aperture of the gate. The magnitude and frequency of this force must be so calculated that tensioning pressure is applied in step with the intermittent movement at the aperture. As a result the entire mass of film is maintained under continuous tension and except at the aperture moves continuously but at varying rates of speed. The instrumentalities which apply this compensating effect to the film also act as guides for it. The system of compensation which has been displaced by the Bundick and Proctor system is that of continuously rotating delivery and take-up sprockets with their associated loops of slack film. A delivery sprocket continuously draws film from a delivery support and feeds it forwardly into a loop whence it is drawn by each intermittently effective pull-down operation of the intermittent claw or sprocket which in turn intermittently delivers the section of film which has just been exposed or projected to another loop which is maintained by a continuously rotating sprocket against the holding effect of the teeth of which the take-up support continuously but yieldingly pulls. To thread such apparatus generally it is necessary that the user carefully position the film upon each sprocket and manually and accurately preform the two loops. According to the Bundick and Proctor system, however, the user merely lays the film in a channel parts of which are formed by two smooth film engaging compensating and guiding members. This system of feeding has proved to result in much decreased damage to the film and longer life for it. While for the reasons indicated above we prefer to use the Bundick and Proctor system, a very important object of this invention is to provide improved apparatus in which conventional continuous sprockets may be employed either in the apparatus or magazine.

As is well known in the art, amateur films are made in several widths, those of present commercial importance in the United States being of sixteen millimeters and eight millimeters. Sixteen millimeter film is exposed and projected in that width. Among the films which have been widely sold on open reels for amateur use is the so-called "double eight." When this film is sold for use within a camera it is sixteen millimeters in width and has rows of perforations adjacent each edge. Thereupon two parallel series of pictures running in different directions are successively exposed. The film is then processed and split and joined by the manufacturer into one of eight millimeters in width and having only one longitudinal series of stable and visible pictures and a single row of perforations and is so projected by the user. One reason for the introduction of the "double eight" has been the ease of loading and manipulating in a camera a film of sixteen millimeters in width in comparison with one of half that width. It will be understood, however, that in order to expose the entire portion of such a film the user must thread it twice. He first threads it and exposes one series on longitudinal pictures occupying one-half of the available surface. He then opens his camera, removes the take-up reel from the take-up spindle, turns it over, again places it on the delivery spindle, and rethreads the film through the camera with the previously unexposed portion in position for exposure so that he may photograph another longitudinal series of pictures adjacent the first. A film of only eight millimeters in width known as a "single eight" is generally considered too small to be easily manipulated by an amateur, particularly for threading within a camera. If a "single eight" film merely eight millimeters in width is housed within a magazine, however, these difficulties of threading and handling are completely overcome, and the user in order to expose a full length of such film merely drops the magazine in place, closes the cover, and proceeds with his photography. All of the trouble for the amateur of handling a film of extremely narrow width is avoided as well as the necessity for stopping the photography in mid-length and rethreading. The initial threading of a "single eight" within a magazine presents no difficulty to the skilled employees of the manufacturer who of course may be supplied with all necessary assistance such as fixtures. While a "single eight" film carried by an open reel has proved impracticable, a "single eight" film in a magazine is welcomed by the user. The objection to such a magazine, however, is that for commercial reasons it may not be everywhere obtainable and certain manufacturers may withhold some types of their films from it, although the "double eight" open reel film may be purchased anywhere. Another and primary object of this invention, therefore, is to provide apparatus which will interchangeably accommodate a "double eight" film upon open reels and a "single eight" film in a magazine.

Throughout this specification and in the appended claims the terms "double eight" and "single eight" are to be taken as generic and not specific. That is to say, a "double eight" film is to be taken as one of relatively great width, irrespective of any specific measurement, which may be cut into a plurality of smaller ribbons to form a "single eight" film which is one of relatively little width, irrespective of any specific measurement. It will also be understood that since magazines and apparatus as described herein are designed to expose or project films of this relatively small width and conventional projecting machines are now designed to accommodate a "single eight"; this term is used broadly to include films which may have been originally exposed or printed as a single film of this or other lesser width. It is also to be understood that an important object of this invention is to supply an apparatus which will accommodate films of different widths, other than the "double eight" and "single eight." For example the constructions which are described and claimed herein may be advantageously employed in apparatus in which the user may expose, project or print films of different fixed widths such for example as those which are both exposed and projected as sixteen millimeters in width, eight millimeters, or nine and one-half millimeters, the latter being a standard which while still used extensively in Europe is not now widely commercially employed within the United States. Also these constructions may be advantageously employed with films differing in respect of other characteristics such for example, as sound and pictorial films, pictorial films, or sound films, or films having different arrangements of perforations.

As previously stated herein, one of the great advantages of the use of a magazine is that it renders the apparatus self-threading since as the user drops or pushes the magazine into position, the film automatically is placed in full operative relation to the apparatus. It is magazines of these characteristics and advantages and apparatus enabling the user to enjoy them which preferably are employed in the practice of our invention. The term "magazine" also has been applied to any chamber, generally light-tight, attached or attachable to a film handling apparatus and having a spindle (or occasionally two spindles) upon which an open reel of film is placed. A film coiled upon a reel may be mounted upon a spindle in a delivery "magazine" of this type, the leading end of the film drawn out by hand, threaded by hand into contact with the film handling members of the apparatus, and then, again as an isolated hand operation, attached to the core of a take-up reel which has been placed upon a spindle within a take-up "magazine." Alternatively, such "magazines" may have two spindles each with an open reel thereon, the film being threaded by hand therebetween and a loop pulled out and threaded by hand upon the film moving and guiding parts of the apparatus. Often such "magazines" are bodily attached to the outside of the apparatus with which they are used. With such "magazines" this invention is not primarily concerned for they act merely as containers which are protective against light or fire or other injury and do not assist in the operation of the apparatus.

In order to accomplish the results herein stated it is highly desirable that both the delivery and take-up masses of the film be mounted wtihin the magazine independently of the spindles of the apparatus which are used to support open reels. For use in several of the preferred forms of our invention the magazine preferably is formed with a light-tight tube extending through the portion wherein is housed the delivery mass, this tube being slightly larger than the spindle of the apparatus and so positioned that when the magazine is mounted within the film compartment as by the devices later described the spindle passes through it without contact. On the take-up side we may prefer to support the core for the film by formations extending from a wall of the magazine toward the interior, and cooperating with the core to prevent light leakage, so that the introduction of a take-up spindle of the apparatus into the magazine is not necessary to position the core and in fact does not do so. Upon the inside of this core we may provide means to grip the spindle so that the core is revolved thereby. If the delivery and take-up cores of the magazine rest upon some part of the magazine when the magazine is not in use but are supported by the spindles of the apparatus as the magazine is inserted into the apparatus, the cores are forced into contact with portions of the interior of the magazine so that undue friction results or alternatively the user must by hand manipulate the cores and spindles into a predetermined relation or add other hand operations. Among the important objects of this invention is to avoid as much manipulation as is possible.

Another and important object of this invention therefore is to provide interchangeable apparatus in the operation of which the user will not find need for hand manipulation or complication or difficulty and also to provide apparatus which is relatively simple and inexpensive to manufacture.

If a user employs a magazine when he wishes to change from one type of film to another as for example from color to black and white, or from a fast expensive panchromatic to a slow inexpensive orthochromatic, he merely opens his camera and takes out one magazine and replaces it with another. In this process, if a light trap is provided, he spoils no film at all, and, if one is not provided, he spoils only a few exposures. If, however, he wishes to change from one type of film to another when he is employing an open reel, he must go into the darkroom and reel up the film upon one of the two reels and then put in the other film. There is, therefore, a danger that particularly when a user is supplied with a camera which interchangeably accommodates magazines and open reels he may inadvertently open the cover when an open reel is in position, thereby spoiling a large section of his film. Such an accident would be particularly disastrous with the "double eight," for in this instance the user would spoil not only the picture which he had just taken, but if at that time he was exposing the second longitudinal series of images, he would ruin the first series which perhaps he had taken sometime previously which might have been irreplaceable.

An important object of this invention is to avoid the above possibility by providing a lock for the latch of the cover which is automatically rendered effective when an open reel is placed in position so that the cover cannot be opened thereafter except following a separate and special manipulation. Preferably, the special means for releasing the lock for the latch includes a member visible in the dark but incapable of fogging the film. Also we may provide mechanism which marks the film upon open reels at the point at which the release for the latch has been operated so that the user later easily may replace it in the camera with the section immediately following that which was last exposed in position for exposure. As a supplement or alternatively, we may provide a visible signal which indicates whether a magazine or an open reel is in position within the apparatus.

In the practice of this invention compensating and guiding elements or either thereof necessary for use with a film supported by open reels are normally positioned within a compartment wherein alternatively a magazine is housed. The mere act of placing a magazine within this compartment is sufficient to remove these elements from the compartment, thereby clearing it for the reception of the magazine. Subsequently the removal of the magazine causes the reappearance of these elements in the film compartment ready for use by a film upon open reels. Certain guiding elements necessary for a film whether upon an open reel or within a magazine are permanently positioned within the compartment and adapted to cooperate with a film upon either type of support. As shown, also, the film gate and that part thereof which determines the focal plane are permanently housed within the apparatus. As previously stated, these compensating members, which are automatically removed and reinstated by the movement of the magazine, may be either of the Bundick and Proctor type or the conventional type employing sprockets with their associated loops of slack film.

Certain apparatus now on the market accommodating very small films is not supplied with any means for compensating for the difference in character of movement between the continuously moving delivery and take-up masses and the intermittently moving section of the film therebetween. Instead, the pull-down claw works directly against the entire delivery mass and the take-up mass winds directly against the teeth of the pull-down. It is to be noted, however, that the tensioning members which we described herein also act as guides, which are necessary even in such incompletely developed apparatus as those which dispense with compensating mechanisms. Consequently an important object of this invention is to provide interchangeable apparatus in which guides necessary for one type of film are automatically removed from the way of another type of film as by the introduction of the carrier therefor into the apparatus and reinserted into operative position by its removal.

Another object of this invention is to provide a film handling apparatus of such characteristics that without any movement of any of the parts, a film supported upon open reels may be brought into engagement with film engaging instrumentalities which are necessary for it but so disposed that they do not interfere with an alternative use of a magazine which carries other instrumentalities necessary for a film supported therein. Preferably in this form of our invention certain of the film engaging elements of the apparatus are adapted to use with a film supported in either manner.

Among the objects of this invention, therefore, is the provision of two alternatively usable film channels, one for a film supported upon open reels and one for a film housed in a magazine. Some of the guides making up these channels are common to both and others are particular to one or to the other. Some may be movable and others fixed, or all may be fixed. Some guiding means may be mounted within the magazine and when it is inserted in its compartment in the apparatus may cooperate with other guides therein to define a channel for such a film.

An object of this invention, therefore, is the provision of a unitary film compartment so designed and equipped that it can be used interchangeably for a film coiled upon an open reel or one housed within a magazine, the necessary adjustments preferably being made automatically.

Another object of our invention is the provision of improved film magazines and improved apparatus for their reception and for the handling of a film supported therein. Another object is the provision of improvements in film handling apparatus.

Still other objects include the provision of apparatus having a film-receiving chamber from which film-moving members, film-compensating members and film-guiding members, or any and all thereof, may be removed and reinstated either automatically or manually.

Another object of our invention is to provide film handling apparatus in which film-engaging members may be operative in one position directly to engage and advance a film having certain characteristics and in another position to operate another similar member so that it may accomplish the same or a similar result upon a film having other characteristics. To accomplish this result, a sprocket for a "double eight" film which is depressed out of the film compartment in readiness for the introduction of a magazine for the "single eight" film may make contact with and operate a sprocket disposed within the magazine and adapted to advance a film housed within the magazine.

Another object of this invention is to provide a film-handling apparatus which is adapted for the alternate reception of a film extending between an open delivery reel and an open take-up reel which is driven in a given direction and a film, shown as enclosed within a magazine the take-up support for which is driven in a direction contrary to that in which the open reel is driven. The take-up spindle upon which is wound a film such as the "double eight" which is designed to be run through the apparatus twice must be rotated in the same direction as that in which the delivery reel is rotated, since after the exposure or showing of one set of images the take-up reel is reversed and placed upon the delivery spindle for the exposure or showing of the other set of images. In certain magazines in commercial use the take-up mass is similarly rotated, but in magazines of the Morsbach type such as illustrated in United States Patents Number 2,175,538 dated October 10, 1939, and Number 2,159,998 dated May 30, 1939, and widely used throughout the world the take-up mass is rotated in the opposite direction. That is to say, the delivery mass in magazines of the Morsbach type and open reels as conventionally used are rotated clockwise, but in the Morsbach magazine the take-up mass is rotated anti-clockwise although open take-up reels are conventionally rotated clockwise. Consequently in one embodiment of our invention we provide mechanism which will wind an open take-up reel in one direction and a take-up support shown as in a magazine in the other direction.

In all but one of the embodiments of this invention we show films of one type mounted upon open reels and of another type housed within a magazine. Our invention may be equally well applied, however, to apparatus adapted for the interchangeable reception and handling of films of different types mounted upon open reels. In a preferred embodiment we show films of different characteristics mounted respectively upon open reels. The introduction of a reel for a film of one type automatically removes from the apparatus the instrumentalities which are necessary for a film of different characteristics supported upon another open reel and as this film is removed from the apparatus the instrumentalities necessary for the other film are available therefor.

Another object of this invention is to provide improved means for mounting a magazine within its compartment. Such mounting means, if desired, especially cooperates with the improved magazine structure previously described, notably the mounting means for the delivery and take-up means therewithin. Another object of this invention is to provide mounting means for a magazine which also serves as a guide upon which a film-engaging member necessary for a film supported upon open reels may be bodily moved out of the way of the magazine upon its insertion.

In one embodiment of the invention latches which hold the magazine in position within the compartment are rendered operative and inoperative by the latch for the cover of the apparatus so that as the cover is fixed in closed position the holding devices are rendered operative and when the latch is released preparatory to the opening of the cover the magazine is also automatically released. Also we may prefer to form and position certain elements of the mechanism which includes compensating members movable by the introduction of a magazine to assist in maintaining that magazine in operative position after the compensating members have been removed thereby accomplishing two functions by one element. In a modification these holding or latching means within the compartment are themselves resilient and tend to overcome manufacturing inequalities between various magazines. Also we provide unitary spring means mounted upon the cover which position a magazine in two planes by the mere act of closing the cover.

Other objects, advantages, and characteristics will be evident from the following portion of this specification, the accompanying drawings, and the subjoined claims. Although we are showing preferred forms only of our invention for purposes of illustration, it will be understood that changes can readily be made without departing from the scope of our broader claims or the spirit of our invention.

In the drawings:

Figures 1a and 1b should be jointly considered. Figure 1a is an isometric view, partially broken away, of a film handling apparatus with the cover of a film compartment open. Figure 1b is an isometric view of a film carrying magazine about to be inserted in the film compartment of Figure 1a.

Figure 2 is a vertical view, partially in section and partially broken away, looking forwardly showing the film compartment with a magazine inserted therein.

Figure 3 is a view, partially in section and partially broken away, similar to Figure 2 in which open reels are inserted in the film compartment. For clarity the driving mechanism is omitted.

Figure 1A:
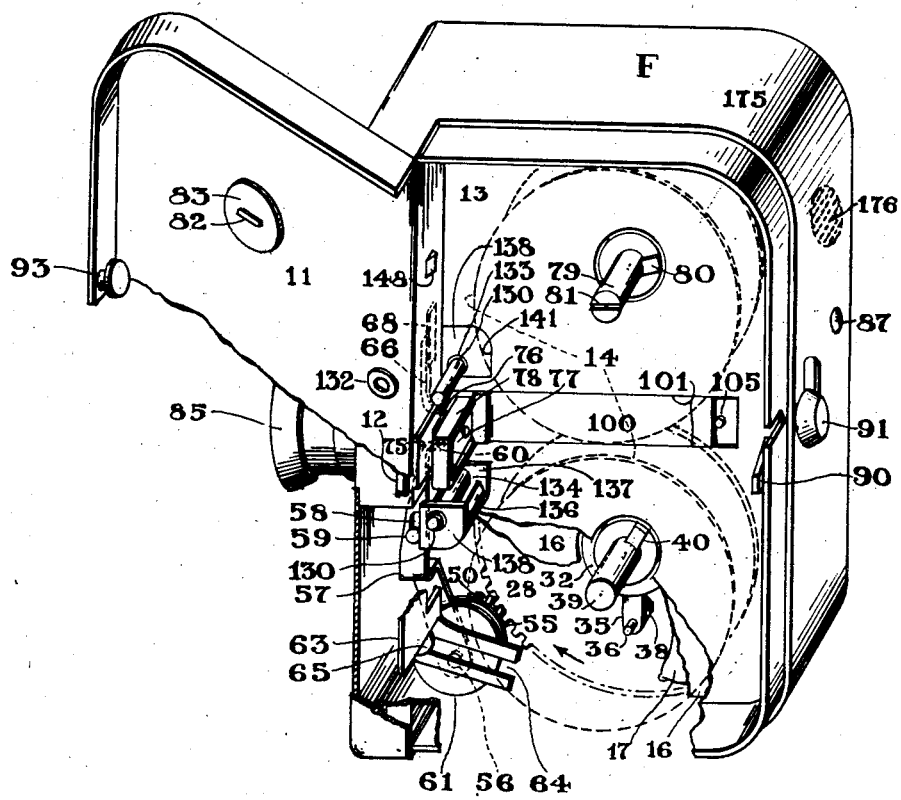

Figure 4 is a vertical side view, partially in section, corresponding to Figure 1a but in greater detail and also showing among other features compensating mechanism in the form of spring tension arms for films carried upon open reels, an automatic lock for the latch for the cover operable only with open reels, and a release for this latch coupled with means for marking the film when the release is operated.

Figure 5 is a detailed view of a spring tension arm for use with film upon open reels taken along the line 5—5 of Figure 4 and looking in the direction of the arrows.

Figure 6:
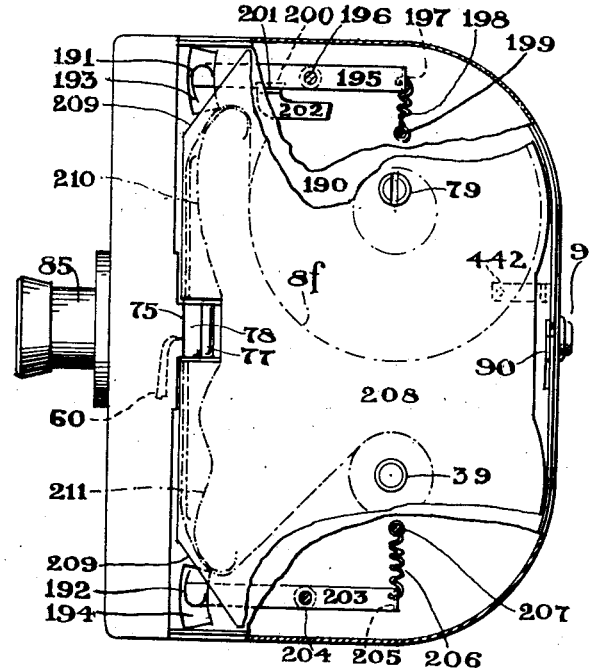

Figure 6 is a vertical side view of an apparatus embodying a modified construction of a film compartment and arrangement of compensating mechanism in the form of spring-controlled oscillating tension arms for a film upon open reels, these arms being mounted in the compartment against bodily movement relatively thereto, and an improved magazine for use with the above.

Figure 6a (ninth sheet) shows in fragmentary form a modification of Figure 6 in which the tension arms are hinged and depressed by the insertion of a magazine within a film compartment.

Figure 7:
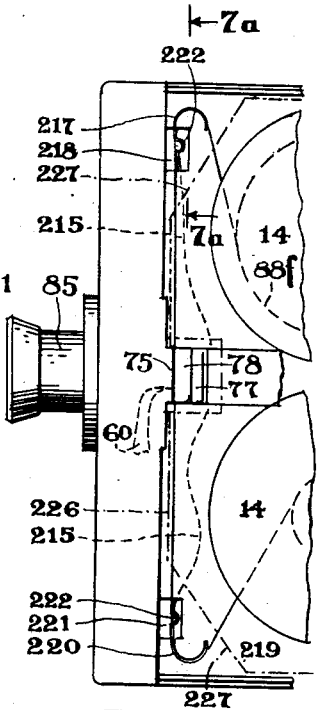

Figure 7 is a vertical side view such as Figure 6 and shows a modified construction of spring tension arms for a film upon open reels.

Figure 7A:
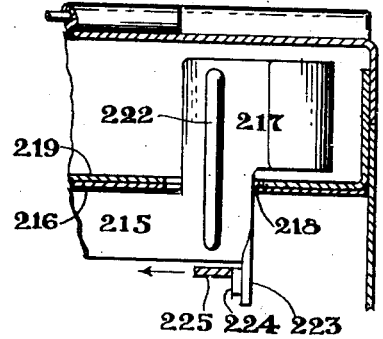

Figure 7a is a detail of a spring tension arm such as shown in Figure 7 taken upon the line 7a—7a of Figure 7 and looking in the direction of the arrows.

Figure 7b (ninth sheet) shows a bodily movable mounting for the tension arms as shown in Figure 7 in which they are depressed by the insertion of a magazine within a film compartment.

Figure 8:
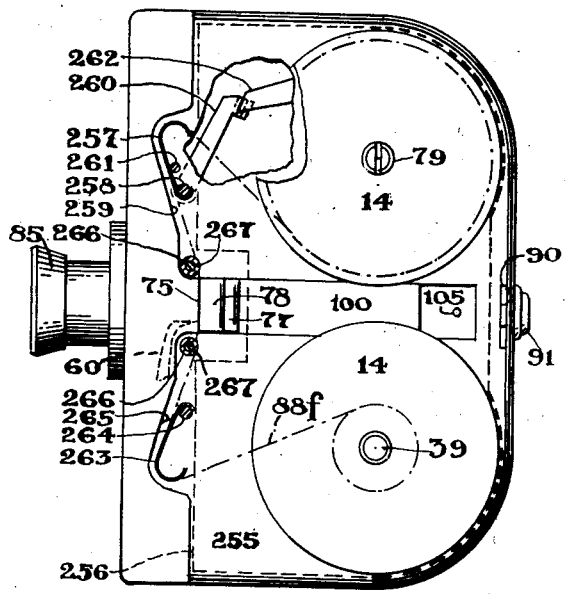

Figure 8 is a vertical side view partially in section of a film compartment showing a further modification of a film compartment and resilient compensating and guiding arms and their control adapted for a film upon open reels.

Figures 8A, 14:
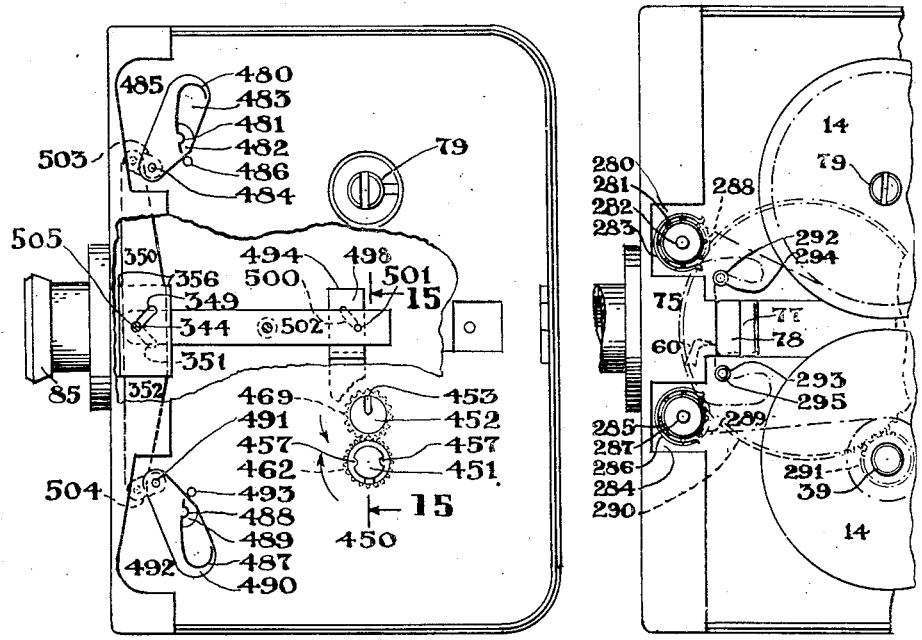

Figure 8a (seventh sheet) is a vertical side view similar to Figure 8. This modification shows sprockets replacing the spring tension arms of Figure 8.

Figure 9:
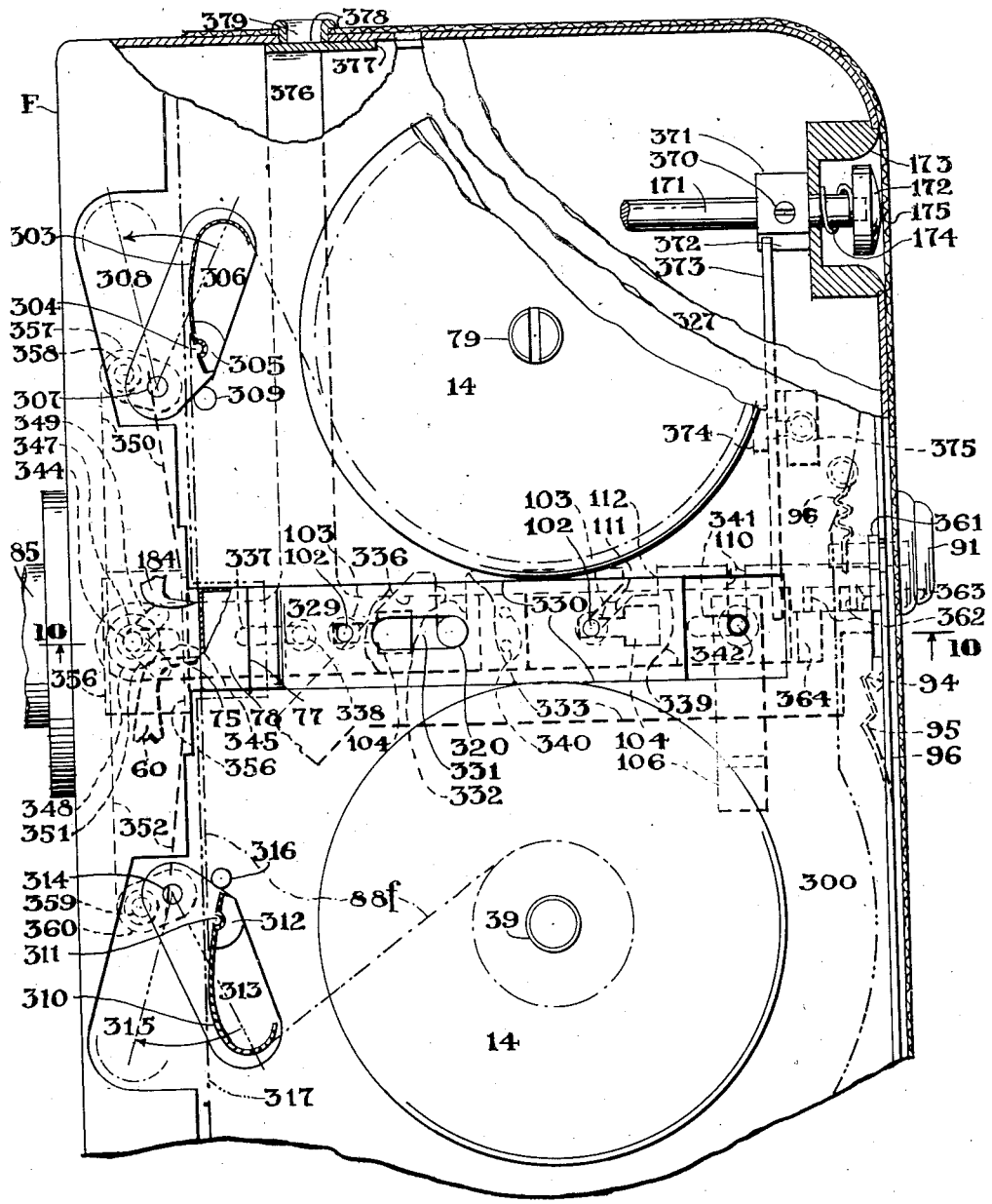

Figure 9 is a vertical side view partially in section of a film compartment showing a modified construction and arrangement of tension arms as compensating and guiding elements for a film upon open reels and a lock for a latch.

Figure 10 is a view, partially in section, taken along the line 10—10 of Figure 9 and looking upwardly and in the direction of the arrows. For clarity parts of the apparatus are broken away and the driving gear train omitted.

Figure 10a is a view, partially in section, similar to Figure 10 in which the pressure of a magazine renders a latch lock inoperable.

Figure 11 is a detailed isometric view of the latch and its control as illustrated in Figures 9 and 10.

Figure 12 is a partial detailed view, similar to Figure 10a, showing an embodiment of our invention in which the resilient guiding members as shown in Figure 9 are manually moved into a recess before the insertion of a magazine within the film compartment.

Figure 13 is a detailed view of tension arms for a film upon open reels showing a modification of the structure of Figures 9 and 10 and with a film magazine, shown partly broken away, about to be inserted within the film compartment.

Figure 13a (sheet two) shows one type of unitary spring for positioning a magazine in two planes, the cover of the magazine compartment being open. Figure 13b is a view of the same mechanism with the cover closed. Figure 13c shows another type of unitary dual-positioning spring, the cover being closed.

Figure 14 is a vertical side view, partially broken away, illustrating a film compartment with a dual directional take-up drive for the accommodation of a magazine of a type in which the take-up rotates in the direction opposite to that of an open reel, the insertion of the magazine depressing a take-up spindle for the open reel and moving tension arms for the open reel out of the way of the magazine and releasing an auxiliary latch lock.

Figure 15:
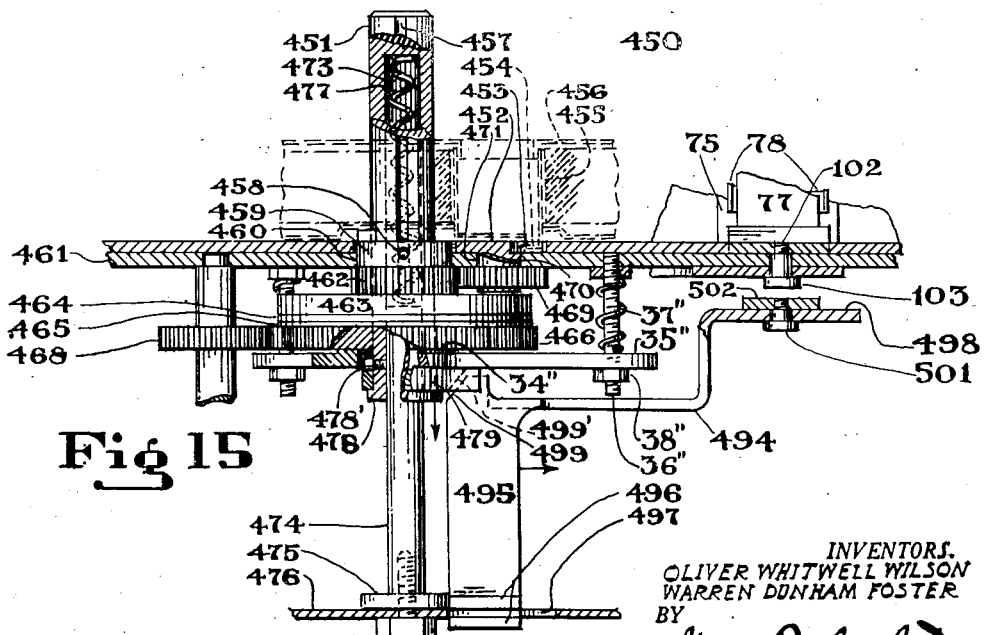

Figure 15 is a section taken on the line 15—15 of Figure 14 and looking in the direction of the arrows.

Figure 16 is a vertical side view, partially in section and partially broken away, of an apparatus with continuously driven sprockets for unsupported loops of slack film carried on open reels and showing means whereby by the insertion of a magazine the sprockets are moved out of its way into recesses and also showing a lock for a latch of the type illustrated in Figures 9 and 10.

Figure 17 is a side view, partially broken away and partially in section, of a modified construction of a magazine in which resilient guiding and compensating members such as illustrated in Figure 1a are replaced by continuously driven sprockets.

Figure 18 is a side view, partially in section, which illustrates a modification of our invention in which continuously driven sprockets are depressible by the insertion of a magazine.

Figure 18a is a section taken on the line 18a—18a of Figure 18 and looking in the direction of the arrows.

Figure 18b is a view similar to Figure 18a showing a magazine with continuously driven sprockets of the type illustrated in Figure 17 inserted within a film compartment of the type illustrated in Figures 18 and 18a.

Figure 19 is a view similar to Figures 18a and 18b but showing means for driving the sprockets of a magazine by their direct engagement with driven sprockets within the body of the apparatus after the sprockets of the apparatus are depressed by the insertion of the magazine.

Figure 20 is a vertical side view of a film compartment in which films of different widths supported on reels of different dimensions may be interchangeably inserted in a single apparatus, the insertion of one of the reels being effective to move the compensating and guiding means for another film out of the way.

Figure 20a is a view partially in section taken on the line 20a—20a of Figure 20 and looking in the direction of the arrows.

Figures 21, 21A:
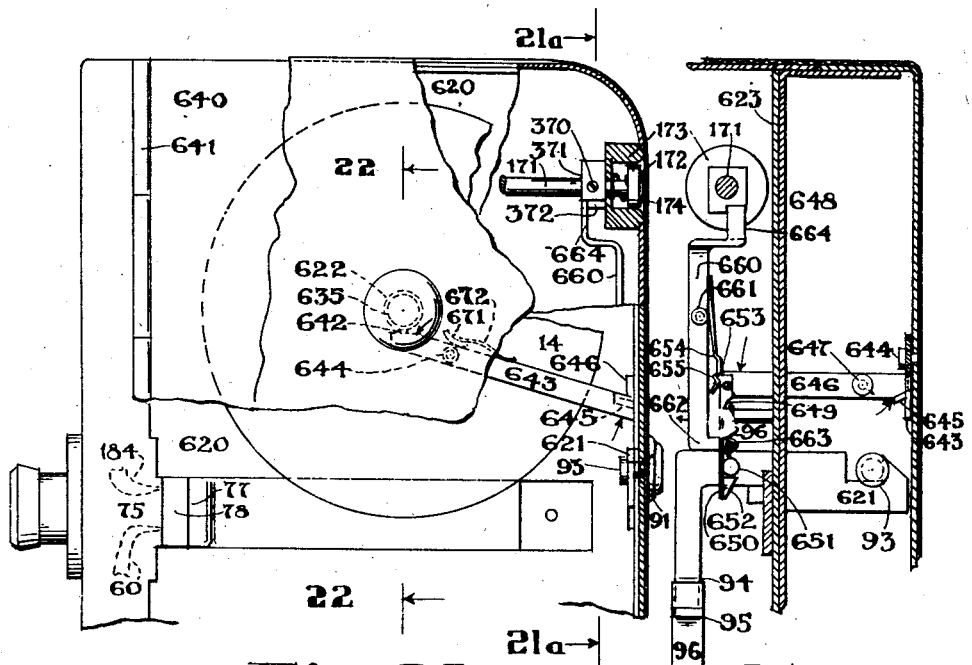

Figure 21 is a view, partially in section and partly broken away, showing a latch-lock, similar to that of Figures 4 and 9, but directly controlled by the placing of an open reel upon a spindle.

Figure 21a is a section taken on the line 21a—21a of Figure 21 and looking in the direction of the arrows.

Figures 22, 22A:
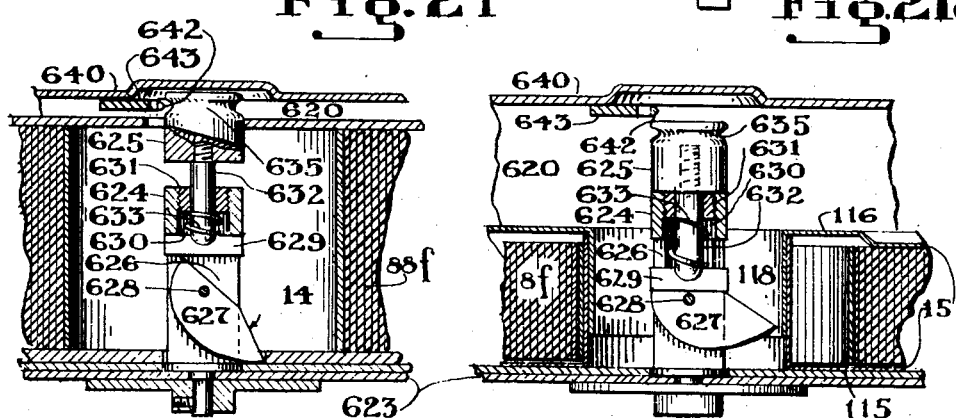

Figures 22 and 22a are views, largely in section, taken on the line 22—22 of Figure 21 and looking in the direction of the arrows. Figure 22 shows an open reel in position and Figure 22a a magazine.

Figures 23, 24:
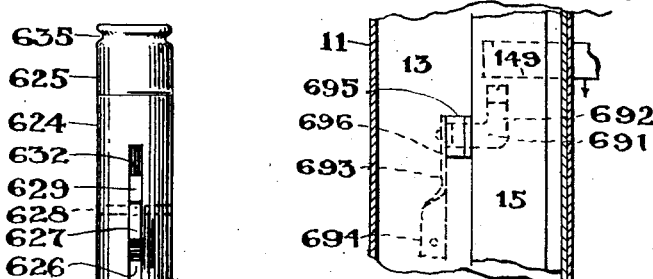

Figure 23 is an elevation of a spindle such as shown in Figures 21, 22 and 22a.

Figure 24 shows a modification of the magazine mounting latch of Figures 1a and 2.

Other objects of our invention are to provide apparatus of the types and accomplishing the results described above and illustrated in the said drawings.

We illustrate our invention as applied to a film handling apparatus, in this instance a camera. This camera may consist of a substantially quadrilateral casing F with a cover member 11, hinged at 12, which closes over a film compartment 13 into which a user may alternatively insert open reels 14 shown in dashed lines in Figure 1a, or a magazine 15. Within the casing F are two bearing plates which make up the main frame, one 16 located adjacent the inside surface of the bottom of the film compartment 13 and a second 17 positioned within the interior of the casing. If desired, the plate 16 may be omitted and the bottom of the compartment may serve instead.

Driving mechanism of the camera (see Figure 2) may consist of a coiled spring 18 housed within a cylindrical casing 19 which is mounted on a driving gear 20 as by bolts 21. The coiled spring 18 is mounted on a shaft 22 and is wound by means of a handle 23. The wound spring 18 is held by a ratchet, or other conventional means, not shown.

The main driving gear 20 engages a pinion 25 mounted on a shaft 26 which rotates in a bearing 27 mounted on plate 17. A gear 28 with a collar 29 is fastened to the shaft 26 as by a set screw 30 and rotates co-axially with pinion 25 and with a suitable take-up slip-drive clutch. Two discs 31 and 32 are separated by a suitable friction material 33 and mounted on shaft 26. A pressure bearing surface 34 on a bearing plate 35 is mounted upon the plate 16 as by bolts 36 surrounded by coiled springs 37. Pressure adjusting nuts 38 threaded upon screws 36 provides adjustable operating pressure for disc 32. Mounted upon disc 32 and rotating in a suitable bearing in plate 16 is a take-up spindle 39 with a lug 40 for engaging a usual formation upon open reels 14 or upon a support for a take-up mass of film in a magazine, although, as later stated, we prefer, a friction grip. Through this mechanism the power of the spring 18 is frictionally applied to a take-up mass. For convenience, we apply the reference character 8f to a film of narrow width such as the sort known in the trade as a "single eight" and 88f to that of broader width such as the sort known as "double eight," and the character f to a film generically, single and double eight having been previously defined.

Gear 28 drives a pinion 45 mounted on a governor shaft 46 rotating in a suitable bearing 47 in plate 17 and a bearing, not shown, in plate 16. A suitable speed controlling brake or governor not shown of any desired type, such for example as that shown in United States Patent Number 1,897,762 to Morsbach dated February 14, 1933, may be used.

An intermittent feeding mechanism and shutter will next be described. Gear 28 also drives a pinion 50 mounted on an intermittent drive shaft 51 which is rotated by gear 28 in the direction shown by the arrow on Figure 1a. Shaft 51 rotates in a bearing 53 which may be mounted on plate 17 and a bearing 54 shown on the camera casing F. Mounted on and driven by shaft 51 is a disc 55 with an eccentrically rotating pin 56 which drives a suitably shaped feeding claw rocking lever 57 having a slot 58 which slides and rocks on a fixed fulcrum pin 59 mounted on plate 16 and having a suitably shaped feeding claw or tooth 60 at its other end, all as best shown in Figure 1a. Rotation of the pin 56 by the uncoiling of the spring 18 gives an intermittent feeding motion to the claw 60. In case films having differing arrangements of perforations are used, the stroke of the feeding claw may be varied as well known in the art, mechanism for securing such variation forming no part of the present invention.

As previously indicated, our invention may be applied to apparatus for sound reproduction, such as a film playing phonograph. It will be readily understood that in such instances a continuously operating film advancing member will be substituted for the above-described intermittent pull-down. Consequently in the claims the term "intermittent pull-down" is to be taken to include a member which continuously advances a film, as for sound reproduction or recordation.

A second disc 61 mounted on pin 56 carries a second eccentric pin 62 moving downwardly and upwardly as shown in the drawings in a plane parallel to the focal plane of the apparatus. A long shutter arm or blade 63, shown broken away in Figure 1a, formed with a bifurcation 64 is driven and guided by a shoulder 65 of the pin 62. Pins 56 and 62 move the shutter blade 63 and the feeding claw 60 in synchronization. A positioning pin 66 is normally held in engagement with a perforation 67 of the film 8f or 88f by means of a spring 68. This positioning pin may be moved out of engagement with the film by any suitable means such as those illustrated in United States Patent Number 2,175,538, Figure 2, issued October 10, 1939, upon application of Kurt Morsbach et al.

The film feeding mechanism is started or stopped by the release or engagement of a lug 69 on the periphery of a disc 70 mounted on shaft 51 with a projection 71 on a control arm 72 which may be operated from the outside of the apparatus by any desired or suitable means such as those shown in United States Patent Number 1,960,062, issued May 22, 1934, upon application of Kurt Morsbach et al.

The feeding claw 60 intermittently moves a film f through a gate which, we prefer, should consist of a fixed front section 75 formed with an exposure opening 76 and a movable back section 77 carrying a spring-pressed plate 78. It will be understood that this gate structure guides both films 8f and 88f. If films having other dimensional characteristics are to be used, the gate structure may be constructed as well known in this art, for example as taught in Patent Number 2,087,250, issued July 20, 1937, to Warren Dunham Foster. All film engaging members whether of the apparatus or of various types of magazines later described are suitably relieved so that the image-carrying portion of the film is not scratched. In many instances for clarity this relief is not shown. Simultaneously with this intermittent movement through the gate the film is unwound from a delivery spindle 79 and coiled upon a take-up spindle 39. So that the film may be wound backwardly upon the delivery spindle, in order that "dissolves" may be made by the user, for example, a lug 80 is provided adapted to engage a usual formation not shown upon the interior of a reel or other film support later described. The delivery spindle 79 may be driven backwardly by engagement between a slot 81 in its outward end and a driving lug 82 mounted on a back-winding button 83 mounted exteriorly of the cover (Figure 3) and normally spring-held in inoperative position.

A conventional lens is shown at 85. An enclosed sighting tube 86 passes between an observation opening 87 at the back of the case f and a finder element 88 adjacent the lens.

A latch 90 operated by a button 91 movable against the pressure of a spring 92 engages a suitable projection 93 mounted on the cover 11 for holding it closed and the apparatus light-tight. Engagement between a V-shaped projection 94 and a V-shaped notch 95 formed in a spring 96 fastened to the case F holds the latch in unlocked position. This latch may move the back or movable portion of the gate 77 as taught in United States Patent Number 2,029,736, issued February 4, 1936, upon application of Morsbach et al. A slide 100, integral with the movable gate section 77, moves in a recess 101 in the floor of the film compartment 13 and upon bearing plate 16 and is guided by pins 102 with shoulders 103 which are movable in T-shaped slots 104 in bearing plate 16. If it is desired to remove the movable gate section 77 from the film compartment for cleaning or otherwise, a stop pin 105 is manually depressed against the pressure of spring 106 suitably fastened to plate 16, thus permitting slide 100 to be moved over the head of pin 105 and permitting the shoulders 103 to pass freely through the heads of the slots 104 whereby the movable gate section 77 and the slide 100 may be removed from the apparatus as for cleaning. A slide 107 with a bifurcation 108 is moved in a vertical plane by a projection 109 extending from the latch 90, and is guided in a direction normal to the focal plane of the camera by a slot 110 through which passes the pin 105. A slot 111 on the slide 107 set at a suitable angle engages one of the pins 102 and, as the slide 107 is operated by the latch, the camming action of the slot 111 moves the movable section 77 of the gate into or out of operative position thereby opening or closing the gate. At its outward end slot 111 has a recess 112 which permits the shoulder 103 of the rearward pin 102 to pass through freely when slide 100 is removed from the apparatus. A projecting arm 113 of slide 107, shown broken off in Figure 4, with a suitable offset not shown may engage the projection 69 on the stop disc 70 of the intermittent drive shaft thus preventing movement of the feeding claw and the driving mechanism while the rear gate section is in inoperative position.

There will now be described a magazine suitable for use within the film handling apparatus previously described. We prefer to employ a magazine embodying the Bundick and Proctor tension control system of feeding as broadly described and claimed in United States Patent Number 1,944,022, dated January 16, 1934. In a preferred form of our invention we show a magazine 15 exemplifying the form of this system taught by United States Patent Numbers 2,159,998, dated May 30, 1939, and 2,175,538, dated October 10, 1939, both issued upon applications of Morsbach et al. This magazine (see Figure 1b) is in effect a quadrilateral box with rounded top and bottom rear corners made of metal or of other suitable material such as a plastic and consisting of a body member 115 and a light-proofing cover 116. The film extends across a gate-receiving recess 117.

Figure 1B:
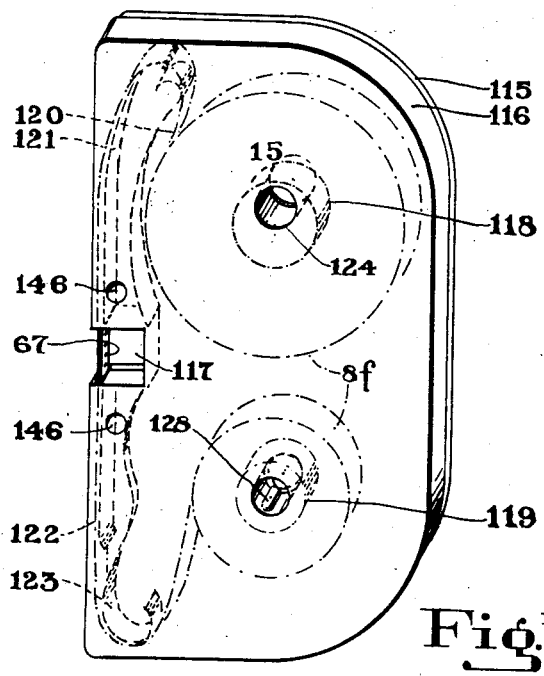

Within the magazine are a delivery core 118 from which the film is unwound, a take-up core 119 to which the film is attached and upon which it is wound, a resilient delivery tensioning member 120, a delivery guiding channel 121, a take-up guiding channel 122, and a resilient take-up tensioning and compensating member 123. In Figure 1b the film 8f is shown in dot and dash line both in mass around the two cores and passing through the gate-receiving recess 117.

A light-tight tube 124 passes through the magazine on the delivery side and includes at the lower or inner end an enlargement 125. The inside diameter of this tube is larger than the outside diameter of the spindle 79 and the enlargement 125 clears the driving lug 90. The core 118 is very loosely mounted upon the outer surface of this tube which therefore serves as a bearing therefor. This core may be split and then joined or may be placed within the magazine before the tube is introduced.

The take-up core 119 is irregularly shaped as best shown in Figure 2 and is supported upon flanges 126 and 127 extending inwardly from the side walls of the magazine and cooperating with the core to form a light-tight passage through the magazine. If, as we may prefer, the take-up core is made out of a resilient metal, driving lugs or protuberances 128 are struck inwardly to grip the spindle 39. Alternatively if the core is unyielding, these driving members may be made of spring material and fastened upon the core as by spot welding.

As the magazine is placed in position in the compartment, the spindle 79 passes through the tube 124 without contact therewith and the spindle 39 passes through the opening in the core 118, the driving members 128 gripping its surface. It will be understood that no hand manipulation of any kind is required from the operator. The magazine is so constructed that the film bridges the gate-receiving recess 117. As the magazine is placed in its compartment, mounting means, later described, both guide the magazine into proper position and hold it there thereafter, the film being directed between the gate sections and the two spindles necessarily being inserted into the openings in the magazine made to receive them and thereafter held in proper relation thereto.

As shown in Figures 1a, 2, 3, 4 and 5, we provide within the film compartment 13 of the film handling apparatus compensating mechanism of the Bundick and Proctor type which is available for a film mounted upon open reels but is automatically moved out of the way upon the insertion of a magazine, the magazine preferably having its own compensating mechanism. One of these compensating mechanisms is disposed upon each side of the gate. Each may consist of a fixed post 130 suitably fastened to plate 17 at 131 and held firmly in position during the operation of the apparatus by a recessed boss 132 mounted on cover 11. Sleeve 133 on the delivery unit and sleeve 134 on the take-up unit are free to slide on posts 130 and are normally held in operative position for film on open reels by coil springs 135.

Resilient tensioning and guiding members 136 of suitable curvature and of suitable spring material are mounted on sleeves 133 and 134 and engage the film 88f as it passes between open reels 14 as shown in Figure 4. Sleeves 133 and 134 are free to rotate on the posts 130 and the resilient members 136 to vibrate freely between film edge guiding plates 137 disposed at the floor 13 of the film compartment and 138 adjacent to the cover 11. These edge guides are kept at the desired distance apart and interconnected by separator rods 139 which also act as stops for the resilient members 136. Suitable guiding projections 140 struck in the bottom edge guides 138 prevent the compensating members 136 when free of film tension from swinging beyond the protection of the edge guides 137 and 138. It should be noted that in Figure 1a for purposes of clarity only we show the delivery compensating unit as in depressed and inoperative position and the take-up compensating unit in extended or operative position. It is of course to be understood that in practice they are both disposed in either operative or inoperative position at the same time. These guiding plates 137 and 138 are of similar shape. When the resilient compensating members are in the position shown in Figure 5 (and upon the take-up side of Figure 1a) adapted for open reels, the upper portion of plates 137 project above the floor of the film compartment 13 and the adjacent plate 16 while the lower portions fit within similarly shaped openings 141 therein. The resilient members and plates 137 and 138 pass freely through these openings when depressed by the insertion of a magazine.

In Figures 1a and 1b, which as stated should be considered as a unit, we illustrate a magazine being introduced into a film compartment 13 of a film handling apparatus in which the movable rear gate section 77 has been moved into open or inoperative position. It will of course be understood that the reels will have been removed. The direction of movement of the magazine 15 into the film compartment 13 is indicated by dash lines connecting Figure 1b to Figure 1a. As the magazine is introduced into the film compartment, core 118 of the magazine fits over delivery spindle 79 of the film handling apparatus and similarly core 119 fits over the take-up spindle 39. Openings 145 and 146 on the body of the magazine and on the cover respectively on either side of the gate recess 117 fit around the fixed posts 130, and, as the magazine is pressed into the compartment, the bottom of the magazine presses against the sides of film edge guiding plates 138 which are relatively adjacent the cover and thereby move both of the film tensioning units below the floor of the film compartment and into the portion of the apparatus between plates 16 and 17 which contains the driving mechanism. As the compensating units are depressed or when they re-emerge, angle braces 147 in conjunction with the fixed posts 130 guide and prevent rotation of the film edge guiding plates 137 and 138. Suitable spring-controlled catches 148 in the front wall of the film compartment 13 hold the magazine in operative position against the pressure of the springs 135 but are automatically opened preparatory to the removal of the magazine from its compartment. As shown in Figures 2 and 3, arms 149, which project in a plane parallel to the focal plane, are struck at right angles to the slide 107 which is actuated by the opening or closing of the latch 90. These arms 149, when the latch is released and the gate opened, engage and move suitable shaped projections 150 struck in the spring catches 148 downwardly and out of engagement with the cover 116 of the magazine. In this way as ejecting pressure of the coil springs 135 push the open reel film guiding units upwardly into position suitable for the use of open reels, the magazine is automatically released and conveniently positioned for its removal from the film compartment. It will be seen, therefore, that the catches 148 and posts 130, which fit into appropriate openings in the magazine, cooperate with the walls of the film-receiving compartment to furnish means for mounting a magazine therewithin. It will also be observed that the operable elements of the mounting means are controlled concomitantly with the operation of the gate. We are not limited to such mounting means, however. Springs, as well known in the art, may be placed upon the cover or one or more of the walls of the film compartment, or the special springs shown in Figures 13a, 13b and 13c may be employed. Also, the improved resilient latches or catches shown in Figure 24, controlled as described above, may be substituted for the catches 148.

As previously pointed out in an apparatus such as this in which both a magazine and open reels may be used interchangeably there is danger that the user may open his camera thinking that he has a magazine in place when in reality he is employing a film wound upon open reels, thus fogging a large portion of the film. We now describe means for preventing this difficulty. As shown particularly in Figures 4, 9, and 12, we lock the latching mechanism of the cover of the film compartment automatically by the tension imposed upon a film by the starting of a feeding operation in which a film carried upon open reels is utilized. Thereafter the user can employ the regular latch for opening the film compartment only by making use of a special releasing mechanism for that purpose. Thus we positively prevent the user from inadvertently fogging a film.

The film 88f passes from a delivery reel 14, mounted upon a delivery shaft 79, over a resilient delivery compensating film-engaging guide 136, between gate sections 75 and 78, over a resilient take-up compensating film-engaging guide 136, and upon a take-up reel 14 which is mounted upon take-up spindle 39. As the intermittent claw 60 starts to move the film through the gate after the release of the stop 71 from engagement with the disc 70 mounted upon the intermittent drive shaft 51, tension is created between the gate and the delivery reel. As previously described, the guide 136 is mounted for bodily movement upon a collar 133 which in turn is positioned about the fixed rod 130. Collar 133 has an extension 151 of smaller diameter projecting downwardly from the film edge guiding plate 137. An operating arm 154 is fixed upon this extension. As the guide 136 is placed under tension operating arm 154 is rotated about the fixed rod 130 as an axis in the direction of the arrow upon Figure 4. A projection 155 at the radial end of this arm thereupon engages a bevelled depending lug 156 formed upon one end of a bell crank 157. This crank pivots on a fixed pin 158 and is formed with an upwardly extending stop 159 which abuts upon the upper wall of the interior of the film compartment 13 and a depending leg 160 from the lower end of which a blocking formation projects. This formation consists of a blocking surface 161 and a resilient catch 162 with a V-shaped projection 163. When tension is first applied to the film as above, the arm 155 moves the lug 156 in the direction of the arrow of Figure 4 rotationally around the pin 158 and the V-shaped projection 163 engages a correspondingly shaped notch 164 which is formed in a projection 165 from the latch slide 90. Simultaneously the blocking projection 161 passes into blocking relation with a cooperating formation 166 which extends to the left as viewed in Figure 4 from the blocking formation 165 of the latch slide 90. Simultaneously an unlocking lug 167 upon the upper portion of the depending leg of the bell crank is brought into engagement with a collar 170 fastened to a shaft 171. In this specification, the word "lug" is employed to include either a separate piece added to a moving member or a formation stamped or formed in such member. It is by the above mechanism that the latch 90 is locked against accidental opening while light-sensitive film is in use within the apparatus.

To release this lock for the latch so that the cover may be opened in the usual way, an auxiliary release mechanism is provided. Button 172 is housed within a recess 173 and is held in operative position by a spring 174 acting against collar 170 fastened to rod 171 upon which the button is mounted. When the button 172 is pressed inwardly the collar 170 which has been brought into contact with the unlocking lug 167 by the previous rotation of crank 157, moves the crank anti-clockwise thereby breaking the engagement between the stopping formations 162 and 164 and thus making it possible for the user to operate the latch 90 without interference.

As an additional safeguard and to encourage the use of this safety device only in the dark room, the unlatching button 172 preferably may be positioned behind leather or other material 175 which has sufficient elasticity to permit the button to be depressed. Alternatively the button 172 may be hidden in an ornamental design or disguised as desired. In order that the button may be easily located within a dark room we may apply a luminous spot 176 on the material 175 or directly on the button 172 in cases in which the material is not employed, this luminous spot being of a well known type which in normal light cannot be seen but glows phosphorescently in the dark.

When a magazine is inserted into the film compartment, the arm 155 together with the associated tension-controlling mechanism is depressed and consequently disengaged from the lug 156 on crank 157. To make this disengagement and subsequent engagement easier the engaging surface of arm 156 as well as the lug 157 may be bevelled.

As an adjunct to the above lock or independently thereof if desired, we may provide a signal which always indicates to the operator whether he is using a film carried by open reels or one protected by a magazine. As shown in Figure 4, a projection 177 of the arm 160 of the bell crank 157 extends at right angles thereto within the body of the camera and to the wall of the case opposite the cover 11. A formation 178 normal to the projection 177 and parallel to the wall has on its outer surface suitable indicia to give through a window 179 on the case F suitable indication as to which type of film support is in use. A red indication may be shown when a reel is in use and the lock for the latch is in locking position and a green indication when a magazine is inserted in the apparatus and the latch-lock is inoperative. Alternatively or in addition words such as "magazine" and "reel" may be used. It will be noted also that under the above arrangement the signal appears green when no film is within the magazine and the cover may be safely opened.

In order that the operator after he has removed the film upon open reels before complete use may readily and correctly re-thread the film with the same portion at the aperture of the gate, we provide simple means for punching a mark or signal in the film by the release of the lock for the latch which is necessarily precedent to the removal of the film from the apparatus. Rod 171 extends toward the front or left-end portion of the film handling apparatus, where by a nut 180 it is loosely connected to a lug 181 formed in the upper portion of a light flat lever 182, pivoted upon a pin 183 and terminating downwardly in a V-shaped knife 184, which, when moved to the right, as viewed in Figure 4, passes through an opening 185 in the fixed section 75 of the gate through the film and into a depression 186 in the pressure plate 78 carried by the movable gate section 77. It will be readily understood, therefore, that movement of the button 172 to unlock the latch automatically causes the knife 184 to make a small identifying hole or notch in the film. The spring 174 immediately returns the knife 184 to inoperative position.

While we may prefer to use the above described lock for the latch and the automatic marking means with the other elements of the invention described herein, it will be readily understood that such joint use is not necessary and that the other elements of the invention may be used without the latch-lock and the identifying means, and that the latch-lock and identifying means or either alone may be used independently of the remainder of the invention.

In the previous portion of this specification we have described preferred forms of our invention in which we dispose tension controlling mechanism within a film compartment for use with open reels, but automatically remove such mechanism by the insertion of a magazine. We shall now describe, and we illustrate in Figures 6, 7, 7a, 8 and 8a, other preferred forms of our invention in which the compensating mechanism is disposed either outside of the compartment within which a magazine is placed or within the compartment but out of its way. In these forms of the invention, the film when supported upon open reels is threaded over tension arms which do not encroach upon the space to be occupied by a magazine, but is fed by the same intermittent claw as is employed with a magazine and preferably through the same gate and wound up by the same take-up support.

In Figure 6 between a delivery support 79 and a claw 60 and adjacent the upper left corner of the film compartment 190 there is positioned a film-engaging and guiding member 191 of a compensating mechanism of the particular Bundick and Proctor type shown in the United States Patent to Proctor Number 1,944,033 dated January 16, 1934. Between a take-up support and the claw and adjacent the lower left hand corner of said compartment is disposed a similar member 192. Each works through arcuate slots 193 and 194 respectively in the floor of the compartment and its adjacent bearing plate. The guide 191 associated with the delivery mass of the film is mounted on a lever 195 suitably pivoted at 196 and provided with a lug 197 from which spring 198 extends to a pin 199 suitably mounted on the bearing plate directly beneath the film compartment 190 floor. A lug 200 may be provided on the lever 195 to engage a suitable projection 201 on a bell crank 202, similar to crank 157 heretofore described, to actuate an auxiliary latch-lock in the manner previously described and illustrated in Figure 4. The take-up tension arm 192 is similarly mounted on a lever 203 pivoted at 204 and provided with a lug 205 from which a tension spring 206 extends toa pin 207 similarly mounted on the bearing plate not shown.

For use in such a film compartment a magazine 208 may be provided with chamfered or otherwise suitably shaped corners 209 to clear the above described tensioning mechanisms. In other respects, this magazine may be essentially the same as that previously described in connection with Figure 1b. It includes tensioning and guiding members. Film 8f is shown in dot and dash lines. When the levers 195 and 203 are free from the tension exerted by a film as it is being fed between open reels, the action of the springs 198 and 206 pulls the guides 191 and 192 toward the top and bottom walls respectively of the film compartment and the chamfered corners 209 of the magazine 208 permit the magazine to be inserted within the film compartment without interference. During the feeding of a film supported upon open reels, however, the guides operate well within the space otherwise free for the magazine.

The modification shown in Figures 7 and 7a illustrates the employment of simplified unitary compensating members each in the form of a single long leaf spring with a supporting portion 215 below the film-receiving compartment and attached to bearing plate 216 and a delivery film-engaging portion 217 extending through a suitable slot 218 in the floor of the compartment 219 and into a position therewithin in which it is adapted to engage a film supported upon open reels 14 between a delivery reel and the gate and a corresponding take-up film engaging portion 220 similarly constructed and functioning and extending through an opening 221 adjacent the take-up. Vertical strengthening ribs 211 prevent the traction of the film from twisting this long leaf spring. The simplicity and cheapness of this improvement over previously known means for carrying out the Bundick and Proctor tension control system of feeding will be evident to those skilled in this art. Neither delivery nor take-up supports are shown, but they may be of any suitable type such as those already described. If desired, a lug 223 depending from the delivery end of the spring 215 may engage a lug 224 upon a crank 225 corresponding to crank 157 previously described in connection with Figure 4.

A magazine 226 shown in dot and dash lines in Figure 7 may also be of the type previously described in connection with Figure 1b, but with chamfered or otherwise suitably shaped corners 227.

In Figure 6a we illustrate an important preferred modification of our invention in which the film-engaging portions of compensating members, mounted upon levers, are so constructed that they are very simply moved out of operative position within the film compartment by the insertion of a magazine. The structure of this modification is closely related to that of Figure 6, but its mode of operation more closely resembles that of the forms of the invention shown in the earlier figures.

A film-engaging guide 230 may be mounted upon a first portion 231 of a lever 232 hinged at 233 and pivoted at 234 on the under side of the wall of a film compartment 235. A spring 236, passing between a lug 237 in the rightward or back portion of the lever as viewed in Figure 6a, is fastened to a pin 238 in the under portion of the case of the apparatus. One end of a leaf spring 239 bears against the under side of the portion of the lever carrying the film-engaging member 230 while the other portion is fastened as by a rivet 240 to the rightward portion of the lever. It will thus be readily seen that when a magazine is inserted in its compartment the film-engaging guide 230 will be forced out of the way. When the magazine is removed the spring 239 will return the lever to operative position.

A similar mechanism may be supplied for the take-up support.

A bell crank 241 terminating in a lug 242 engages a projection 243 on the downward side of the pivoted lever, and when the film-engaging member 230 is placed under tension, operates as previously described in connection with bell crank 157 of Figure 4 to lock the latch 90 against inadvertent release.

Figure 7b shows another preferred modification of our invention in which we employ a magazine which does not have chamfered corners, such for example as those of the type 15 in Figure 1b, and a compensating spring such as that of Figure 7 but recessible as shown in Figure 1a upon the insertion of the magazine. A long irregularly spaced tensioning spring 245 having film-engaging guides 207'' is mounted upon a splined rod 246 which slides through an opening in a collar 247 which is attached to the under portion of a supporting bearing plate 248 disposed underneath the floor of the film compartment. A compression spring 249 is coiled about the rod 246 and, passing from the collar 247 to a bracket 250 which extends from the tension arm 245, tends to hold the rod and guides in operative position within the film compartment. As a magazine is put into the compartment, this entire structure is depressed out of the way. It is, of course, understood that the openings 218 and 221 in the floor of the film compartment 219 in the embodiment of this invention shown in Figures 7 and 7a will be sufficiently large to accommodate the similar film-engaging portions as 217 and 220 in Figure 7 when they are depressed by the insertion of a magazine.

Included in the above embodiments as illustrated in Figures 6a and 7b are in effect ejector mechanisms for the magazines. Upon release of the catches 148 which hold a magazine in operative position, as illustrated in Figures 2 and 3, the outward pressure of the springs 239 as shown in Figure 6a and of spring 249 as shown in Figure 7b will force the magazine outwardly from the respective film compartments, thus facilitating its removal.

In the modification of this invention shown in Figures 8 and 8a, compensating members for use with open reels are disposed within recesses adjacent the gate. These members cooperate with other guiding means with the result that there are provided alternatively available film-guiding channels, one for a film supported upon open reels and another for a film supported in a magazine, having certain parts in common but having other parts which cooperate only for use with an open reel and others which cooperate only with a magazine.

As shown in Figure 8, a film-receiving compartment 255 is adapted to receive either a film 88f supported upon open reels 14, shown in dot and dash lines, or alternatively a magazine 256, shown in Figure 8 in dotted lines, which may be of the type of Figure 1a. A resilient compensating and guiding member 257, preferably in the form of a leaf spring, is mounted on a post 258, both compensating member and post being disposed within a recess 259 placed between the gate and a delivery spindle 79. Post 258 is mounted upon and rotatable with a lever 260 which is disposed within the body of the apparatus. A stop pin 261 limits the rotation of both lever and pin. Lever 260 may be adapted to coact with bell crank 262, similar to 157 shown in Figure 4, to operate the lock for the latch in the manner described in detail hereinbefore. A similar resilient compensating and guiding member 263 mounted in any desired manner upon a fixed post 264 is disposed within a recess 265 adjacent the take-up spindle 39. Guiding rollers 266 rotate upon pintles 267 disposed respectively above and below the gate.

To employ a film mounted upon an open reel, the user opens the gate by moving the button 91 upwardly as shown in the drawings, thereby moving the movable gate section 77 and the spring-controlled pressure plate 78 away from the fixed gate section 75. He places open reel 14 upon the spindle 79 and passes the leading end of the film over the tension member 257, past the upper roller 266, through the gate, past the lower roller 266, about the tensioning member 263, and attaches the end to the take-up reel 14. He thereupon closes the cover, not shown in Figure 8, latches it, and starts the operation of the mechanism, whereby under the influence of the intermittent feeding claw 60 and the frictional drive for the take-up shaft such as that previously shown and described, the film is fed through the apparatus, compensation being supplied by the tensioning arms 257 and 263. As the film is first advanced, the delivery tensioning member 257 is moved clockwise as shown in Figure 8, thereby through the coaction of levers 260 and 262 locking the latch 90 against accidental movement. It will be understood that in this operation the film is guided by the rollers 266 as well as by the gate and tension arms.

When the user wishes to employ a film housed within a magazine, he removes both reels 14 and places in the film-receiving compartment 255 a magazine 257 which may be as shown in Figure 1b, the gate being open. Compensation in this instance and a portion of the guiding function are supplied by tensioning members, such as 120 and 123 shown in 1b, within the magazine. Upon the closing of the cover and the latching of the gate, the film is further guided by the gate sections 75, 77 and 78. As best shown in Figure 1b, the guiding channels 121 and 122 of the magazine closely cooperate with the tensioning and guiding members 120 and 123 and also with the gate sections 77 and 75 and its pressure plate 78 continuously to guide the film from the delivery support to the take-up support.

As previously pointed out, compensation for the difference in character of movement between the continuously moving portions of the film at the delivery and take-up supports respectively and the intermittently moving section at the point of exposure may be provided either by the Bundick and Proctor tension control system of feeding or alternatively by continuously moving sprockets with their associated unsupported loops of slack film. In Figure 8a we illustrate a further modification of our invention in which compensation is afforded by such conventional sprockets.

Above a gate in a recess 280 is a delivery sprocket 281 mounted for continuous revolution upon a shaft 282 and having a guide 283. Below the gate a similar structure consists of a recess 284 in which a continuously driven take-up sprocket 285 associated with a guide 286 revolves upon a shaft 287. Fixed to the lower ends of shafts 282 and 287 and within the body of the apparatus are pinions 288 and 289, respectively, both of which mesh with a large gear 290 which, through a pinion 291 and a slip clutch, not shown but of the type previously described or of any other desired or suitable character, drives a take-up spindle 39. The large gear 290 is continuously driven from the power spring 18 (Figure 2) in any desired or conventional manner. Guiding rollers 292 and 293 are disposed upon shafts 294 and 295 placed respectively above and below the gate.

To use this form of the apparatus, the user opens the gate, places an open reel 14 of film 88f upon the delivery spindle 79, threads the leading portion about the delivery sprocket 281, manually forms a loop between this sprocket and the idler 292, passes the film between the gate sections 75 and 77 with 78 and over the roller 293, there forming another loop, threads the film over the take-up sprocket 285, and attaches the leading end to the take-up reel 14. Upon the closing of the cover of the gate and starting of the apparatus, the film is fed in the usual manner.

When the magazine is to be employed, the cover is opened, both reels removed, and the magazine of the previously described type such as that shown in Figure 1b is inserted. Thereupon, as previously described in connection with Figure 8, the film is guided from the delivery to the take-up support. The portion of the guiding channel formed by the gate members 75 and 77 with 78 and the rollers 292 and 293 is common in each instance, but other portions peculiar to the magazine are housed therewithin and the guiding surfaces of the sprockets 281 and 285 and the guides 283 and 286 affect only a film disposed upon an open reel.

In the preferred modification of this invention shown in Figures 9, 10 and 11, compensating and guiding members for use with a film supported upon open reels are disposed within a film compartment when they are in operative position, but the insertion of a magazine automatically moves them out of its way and into suitable recesses in the front wall of the film compartment.

Within a film compartment 300 equipped with a cover 301 hinged at 302 are disposed a delivery spindle 79, a take-up spindle 39, an apertured fixed gate section 75, and a movable gate section 77 with a pressure plate 78. The gate and latch-lock are constructed and operated as previously described except as specifically noted hereinafter. Film 88f, shown by a dash and dot line in Figure 9, is threaded from an open reel 14 upon the delivery spindle 79 through the gate and is guided by compensating members on either side of the gate and attached to a take-up reel 14 upon the take-up spindle 39. The compensating member on the delivery side may consist of a resilient film-engaging guide 303 with a reinforcing transverse rib 304 and having a right angled mount portion 305 attached to plate 306. Plate 306 both serves as a guide for one edge of the film and a swinging support for the compensating member. This compensating member may be constructed of a single leaf spring formed as indicated above.

Plate 306 is mounted on a shaft 307 rotatable in a bearing not shown in the floor of a recess 308. Plate 306 is swung into the recess 308 when a magazine is placed in the film compartment 300 or a stop 309 mounted on the floor of the film compartment holds it in operative position for a film supported on open reels as shown in Figure 9. The guiding and compensating member on the take-up side of the gate is similarly constructed. It may consist of a resilient film-engaging member 310 with a reinforcing rib 311 and a mount portion 312 supported upon a film edge guiding plate 313 which is swung on a shaft 314 between a recess 315 and a position on the floor of the film compartment 300 limited by a stop 316.

When a magazine 317, the position of which when within the film compartment 300 is indicated by a double dot and dash line, is inserted therein, the plates 306 and 313 are simultaneously swung into their respective recesses 308 and 315 by the following mechanism. A rod 320 with a camming deformation 321 projects outwardly into the film compartment 300, as shown most clearly in Figure 10. Rod 320 is held in operative position by a spring 322 coiled about it and at one end fastened at 323 and at the other pressing against bearing plate 324. To prevent rotation the lower portion of rod 320 has a groove 325 which receives a suitable formation not shown in a guiding opening 326 in plate 324 through which the rod slides. Below plate 324 the rod 320 has a head 328 which limits its upward movement to operative position.

In order that the slide 329, generally corresponding to the slide 100 previously described, of the movable gate section 77 may be free to move in a recess 330 in the floor of the film compartment, a suitable slot 331 is provided. A slot 332 for rod 320 is made in a slide 333, corresponding to 107, which operates the movable gate section 77 with 78 following manual operation of the latch as heretofore described. Rod 320 is further guided by this opening 332 and one 334 in bearing plate 327.

Upon the insertion of a magazine, the rod 320 is depressed into the body of the apparatus in the direction of the arrow (Figure 10) against the pressure of the spring 322. When initial pressure is applied to the rod 320, the cam 321 passes through an opening 335 formed in a slide 336 and moves it rearwardly. Slide 336 is guided by a slot 337 through which passes a pin 338. To the rearward or rightward of the slide 336 as seen in the drawings is a leaf spring 339 which may be fastened to the slide 336 as by rivets 340. The combined slide 336 and leaf spring 339 are further guided by means of slot 341 through which passes a stop pin 342 corresponding to pin 105 of Figure 4. When this pin is manually depressed the movable gate section 77 with 78 may be removed as for cleaning. The slide 336 is held in its forward position by a spring 343 (see Figure 10) suitably mounted on the camera body and by an extension of a pin 344 the main purpose of which is to swing the tension arms.

Pin 344 is guided by a slot 345 in bearing plate 327 and passes through an opening 346 at the forward end of slide 336. A head 347 upon pin 344 bears against the upper surface of plate 327. Below this plate, pin 344 passes through a separator sleeve 348. This sleeve and pin work in a cam slot 349, set at a suitable angle to the optical axis of the apparatus, formed in a link 350 and a cam slot 351 set at a reverse angle to said axis in a link 352. Below the opening 346 in the slide 336, a nut 353 (see Figure 10) is threaded onto the pin 344 and holds the above units in sliding engagement one to another. Links 350 and 352 are also held in mutual engagement as they slide by edge guides 356 depending from link 352. To the upper end of link 350 as viewed in Figure 9 by means of a pintle 358 is pivoted a crank 357 which is mounted on the shaft 307. Similarly by means of a pintle 359 is pivoted to the lower end of link 352 a crank 360 which is mounted on the shaft 314.

By the above means it will be seen that when the slide 336 is moved rearwardly or to the right as viewed in the drawings upon the initial depression of the rod 320, the pin 344 sliding in cam slots 349 and 351 moves link 350 downwardly as viewed in Figure 9 and through the crank 357 swings the plate 306 into its inoperative position in the recess 308. Simultaneously and by similar means, the plate 313 is swung into its inoperative position in its recess 315. In this manner the film compartment 300 is automatically made ready for the further and complete insertion of the magazine where it may be held in engagement by any suitable means or as heretofore described.

In addition the above mechanism may be employed to release a device for locking a latch which has been placed in operative position as previously described when film supported on open reels is in use within the film compartment 300. This latchlock is not required when a magazine is in use. In Figures 9, 10 and 11, a latch 361, corresponding to latch 90 of Figure 4, is manually operated by a button 91 on the outside of the camera case. An irregularly shaped control member 362 extends frontwardly and downwardly, as viewed in Figure 10, from the latch 361 and in its portion relatively adjacent the latch engages a bifurcation 363 in the slide 333, this bifurcation corresponding to 108 in slide 107 heretofore described which moves the movable gate section 77 into and out of operative position, by means heretofore described, and in its terminal portion engages and is normally blocked by a terminal portion 364 offset from the body of a leaf spring 339 attached to and extending rearwardly, as viewed in Figure 10, from plate 336. When the slide 336 is moved rearwardly or to the right as viewed in Figure 10 by the depressing of the rod 320, the offset extension 364 is moved out of blocking position thus freeing the end of the control member 362 so that the operator is then free to operate the latch as long as a magazine is within the film compartment 300. However, when a film supported on open reels 14 is within the film compartment 300 an alternative latch-lock release which prevents inadvertent opening of the cover as previously explained must be employed.

As shown in Figure 9 a releasing button 172 is mounted on a shaft 171, which is held in operative position by a spring 174 housed in a suitably shaped recess 173. This button 172 is preferably beneath the covering material 175 of the case, all as previously shown and described in connection with Figure 4. Also, as previously described, shaft 171 operates knife 184 which cuts a signalling notch into a film. Releasing mechanism for the latch-lock which differs from that of Figure 4 will now be described. Mounted on the rod 171 as by a set screw 370 is a collar 371 with a bevel or cam surface 372. When the button 172 is manually depressed, the bevel 372 swings the upper end of a lever 373 mounted upon pin 374 on a bracket 375 suitably mounted under plate 327 towards the under surface of plate 327. The lower end of the lever 373 rests on the outer surface of the leaf spring 339 attached to the slide 336. Movement of the button 172 and the consequent swinging of the lever 373 depresses this spring in the direction of the arrow of Figure 10 out of engagement with the holding member 362 attached to the latch 361. The latch is thereupon free to be operated and the cover opened and the film supported on open reels removed from the film compartment.

In order that a user may see whether a magazine or an open reel is positioned within the apparatus, a signal may be actuated by this form of our invention. A projection 376 from the slide 336 may extend to the upper wall of the case F and be formed with an offset portion 377 upon the upper surface of which are colored indicia 378 visible through a window 379 all as heretofore described.

In Figure 10a we show a modification of the release for the latch-lock. As rod 320 is depressed by the insertion of a magazine, slide 380, corresponding to slide 336 in Figure 10 heretofore described, guided by a pin 381 fastened to a bearing plate 382 and working through a slot 383, is moved rearwardly or to the right as viewed in Figure 10a and as already described the compensating members are recessed out of the way of the magazine. Pin 384, corresponding to 105 heretofore described, is normally held above the floor 385 of a film compartment by a spring 386 corresponding to spring 106 heretofore described. A sleeve 387 spaces slide 388 corresponding to 107 heretofore described, from a locking arm 389 mounted on pin 384. Normally arm 389 engages and locks the leftward end, as viewed in Figure 10b, of an irregularly shaped control arm 390 which corresponds to control arm 362 previously described. Upon the insertion of a magazine, pin 384 is depressed against the pressure of spring 386 thus disengaging locking arm 389 from blocking the movement of the latch 361. Similarly by means heretofore described lever 373 (see Figure 9) depresses the arm 389 when the unlocking button such as 172 as shown in Figure 9 is depressed. Further manual depression of pin 384 into the recess 330 in the film compartment floor 385 permits slide 329 to be removed from the camera by means heretofore described.

The above means of releasing the latch-lock by depressing the stop pin 384 may also be used in the previously described embodiments of our invention which are illustrated in Figures 6, 6a, 7, 8, 8a, 16, 17, 18 and 19.

In Figures 9, 10, 11, and 10a we show automatic means for moving the guiding and compensating means for a film supported upon open reels into suitable recesses in a wall of a film compartment. In Figure 12 we show manually operated mechanism for clearing a film compartment of elements necessary only for use with a film upon an open reel. Except as described below, this structure is the same as that described in connection with Figure 9.

A pin 395 mounted on a slide 396 is guided by a slot 397 in the slide 398 upon which is mounted a movable gate section 77 with a spring pressure plate 78 as heretofore described and shown in Figure 10, and also by a second slot 399 in a bearing plate 400. The head of the pin 395 projects into a film compartment 401 and may be moved manually rearwardly in the direction of the arrow. A resilient latch member 402 with a notch 403 is mounted upon the under side of the plate 400 and engages V notches 404 and 405 in the slide 396. The forward or leftward portion of the slide 396 cooperates with the pin 344 and slides 350 and 352 and their associated parts exactly as described in connection with Figures 9 and 10 thereby moving film-engaging and co-operating guides 303 and 310 into and out of the film compartment. Therefore movement of the slide 396 operates these guides as described heretofore. At the same time latch 402 is released from engagement with notch 404 and brought into engagement with notch 405. The film compartment 401 will then be in a condition to receive a magazine. If it is desired to insert film coiled on an open reel the pin 395 is manually moved forwardly thereby bringing the guiding means into operative position and the latch 402 into engagement with notch 404.

In the modification of the invention illustrated in Figure 13, the compensating and guiding members are cammed out of a film compartment 410 by a magazine 414 as it is placed into position and returned to operative position by spring tension. Associated with a delivery support not shown is a resilient film-engaging guide 411, which may be in the form of a leaf spring, mounted upon a vertical L-shaped support 412 which in turn is mounted upon a combined edge guide and swinging plate 413. An upper portion of the L-shaped support is formed into a bevelled or cammed surface so that as the magazine 414, similar to 15 shown in Figure 1b, is placed into the compartment contact between a wall of the magazine and the cam surface cams the tensioning and guiding structure out of the way. A vertical reinforcing rib 415 holds the spring against distortion. The structure pivots at 416 into a recess 417, similar to 308 heretofore described in connection with Figure 9. It is of course understood that the magazine 414 must be so shaped that when in operative position it will clear the free ends of the resilient film-engaging guide 411. A spring similar to spring 339 of Figure 9 holds the compensating assembly in operative position when the magazine is removed.

In order to actuate the release for the latch which holds the cover 420 in a closed position a shaft 421 connects a crank 422 with the swinging plate 413. Crank 422 in turn is attached to a connecting control member 423 which by means of the construction described in connection with Figures 9, 10 and 11 actuates the release for the lock.

As previously stated, a magazine may be mounted within a film-receiving compartment by the co-action of the walls thereof, the latches 148, which are automatically removed from holding position, and the posts 130 and openings 146 in the magazine which receive them, or by conventional springs not shown, or by the improved means which are shown in Figures 13a, 13b and 13c (Sheet 2), or by the improved means shown in Figure 24 (last sheet), or by an appropriate combination of any of the above.

As shown in Figures 13a and 13b, a magazine 425 may be inserted into a film-receiving compartment 426 which is closed by a hinged cover 427, having a depending portion 428, which makes a light-tight joint with a flange 429 surrounding the film compartment and forming a portion of its back wall. To this protuberance is fastened as by rivets 430 a spring 431 which is formed to include a camming or control portion 432, a top-holding portion 433, and a back-holding portion 434. It will be understood that these various portions are placed within a single spring by a forming or bending operation. As is clearly shown in Figure 13b as the cover for the film compartment is closed the inner or rearward depending portion 428 engages the camming portion 432 of the spring and forces it from the position shown in 13a to that shown in Figure 13b. Thereupon the portion 433 engages the top of the magazine 426 and forces it downwardly while the protuberance 434 engages the rear wall and forces it forwardly. As the cover is opened the spring moves backwardly as shown in the drawings to the position shown in Figure 13a so that the magazine can be readily removed. More than one spring 431 may be employed.

Figure 13c shows another means for accomplishing the same result with a single spring or springs attached to the cover. A magazine 439 is placed in a film-receiving compartment 440 which is closed by a hinged cover 441 to which is attached a spring or springs 442. These springs are irregularly formed with one protuberance 443 which when the cover is closed presses upon the top wall of the magazine and another protuberance 444 which presses upon the back wall of the magazine. It will thus be seen that as in the form of the invention shown in Figures 13a, 13b and 13c a single spring or springs is so shaped that it engages both the top and back walls of the magazine. Thus a single instrumentality simultaneously positions the magazine in two planes.

In the preferred modification of this invention shown in Figures 14 and 15 and for the reasons previously stated, we provide mechanism which will wind an open take-up reel in one direction (clockwise as shown) and a magazine support in another direction (anti-clockwise as shown). We prefer to accomplish this result by depressing a take-up spindle for an open reel by the insertion of the magazine and at the same time removing from the film compartment the compensating elements.

Within the film compartment 450 there are provided a take-up spindle 451 for an open reel, rotating for example in a clockwise direction, and a driving member 452, rotating in the opposite direction, for example anti-clockwise, and including a suitable driving recess 453 which coacts with a similar member 454 upon the inside of a take-up core 455 for a magazine 456.

Vertical splines 457 formed in spindle 451 are engaged by pins 458 or the like in collar 459 which rotates in a bearing 460 fixed in the bearing or supporting plate 461. Formed as a part of collar 459 or attached thereto is a pinion 462 which is mounted for rotation with a disc 463 which in turn is yieldingly driven by friction material 464 mounted on a friction plate or surface 465 of a driven gear 466. Gear 466 is driven by pinion 468 which through a suitable conventional gear train may be driven by the spring 18 of the apparatus. The degree of yielding pressure applied by the slip clutch may be adjusted as illustrated in Figure 2 or any other suitable frictional drive may be employed.

To drive the take-up core of a magazine 456, pinion 462 engages pinion 469 preferably but not necessarily of the same diameter and number of teeth. Pinion 469 is mounted on a shaft 470 which rotates in a bearing 471 in bearing plate 467. An engagement disc 452 in which a suitable slot or other means 453 receives a projection 454 mounted on the interior of the take-up core 455 of the magazine 456.

As previously stated, the insertion of a magazine 456 bodily depresses the spindle 451. The spindle is formed with a hollow core 473 which upon the depression of the spindle is guided by and slides along a fixed post 474 suitably mounted at 475 on bearing plate 476. A coiled compression spring 477 is disposed within the core 473 and returns the spindle to operative position when the magazine is removed. The hollow spindle 451 has a projecting lip 478 which supports a sleeve 479. When the spindle is depressed, a pin 478' mounted on the lower portion of the spindle 451 also depresses the sleeve 479.

Bodily movable tension controlling members such as described in connection with Figures 9 and 10 are operated jointly with the above described bodily movable spindle. The compensating member on the delivery side may consist of a resilient film-engaging guide 480 with a reinforcing rib 481 and having a right angled mount portion 482 attached to plate 483. This member may be a single leaf spring formed as indicated above. This plate 483 is mounted on a shaft 484 rotatable between an inoperative position within the recess 485 when a magazine 456 is placed in the film compartment 450 and an operative position for film supported on open reels adjacent a stop 486 mounted on the floor of the film compartment.

The take-up guiding and compensating member is similarly constructed. It may consist of a resilient film-engaging member 487 with a reinforcing rib 488 and a mount portion 489 supported upon a film edge guiding plate 490 which is swung on a shaft 491 between a recess 492 and a position on the floor of the film compartment 450 limited by a stop 493.

When a magazine is inserted in its compartment the plates 483 and 490 are simultaneously swung into and out of their respective recesses by a connection with the depressible spindle 451. An actuating or control plate 494 of irregular L-shaped configuration transfers the bodily motion of the spindle to a control mechanism for the compensating members similar to that previously described. This plate includes a depending slide 495 which is guided by suitable bifurcated projections 496 sliding in a slot 497 in bearing plate 476 and another surface 498 struck at a right angle thereto and hence disposed parallel to the floor of the film compartment 450. A cam surface 499 is formed on the upper portion of the depending leg 495 of the member 494 for cooperation with a camming bifurcation 499' formed on the sleeve 479 movable with the spindle 451. A control slot 500 in the vertical portion 498 of the slide engages a pin 501, which is fixed to a slide 502 which corresponds to slide 336 of Figure 9. This slide through pins 503 and 504 in the manner previously described moves the plates 483 and 490 into and out of their respective recesses.

As the magazine 456 is inserted, the spindle 451 is depressed against the power of the spring 477 and camming surfaces 499 and 499' move the control slide downwardly, thereby not only depressing the spindle 451 out of the way of the magazine but also through the connection between the pin 501 and slot 500 moving the tension control members out of the film chamber. The result is that the film chamber is free for the reception of the magazine and also the take-up support 455 of the magazine is rotated anticlockwise. Upon the removal of the magazine from the film compartment, the spindle 451 is returned to its operative position by the spring 477, thereby placing the apparatus in condition for the reception of the film disposed upon open reels 14 of which the take-up is revolved in the opposite direction from the revolution of the take-up mass of the magazine. Spring 505 returns the control plate 494 to the position shown in Figure 15. For clarity, the claw and gate with its operating mechanism have not been shown in Figure 14. The movable section of the gate may be actuated by the latch as heretofore described in connection with Figure 9.

In previous embodiments of this invention we have shown it as applied to both film handling apparatus and magazines which make use of the Bundick and Proctor tension control system of feeding, but it may be applied to apparatus or magazines which employ continuously rotating sprockets with their associated loops of slack film. In Figure 16, we show continuously driven sprockets for an open reel normally disposed within a film compartment but automatically removed therefrom by the insertion of a magazine. Figure 17 shows a magazine in which compensation is likewise secured by continuously driven sprockets.

In a film compartment 510 of Figure 16 there are disposed a delivery spindle 79, continuously driven delivery and take-up sprockets both designated as 511 and each with a guide 512, a gate composed of a fixed front section and a movable back section with a spring-pressed plate not shown which may take the form shown in Figure 1a, which may be controlled by a latch 90 in the manner previously described, a feeding claw 60, and a take-up spindle 39. Film 88f, shown by a dot and dash line, extends between open reels 14 through the gate and into contact with each sprocket 511, loops of slack film being provided adjacent each.

Since the drive and control of both sprockets is the same, only that for the delivery sprocket will be described. Sprocket 511 rotates on a shaft 513, mounted in a bearing not shown in a recessible plate 514. Shaft 513 and hence sprocket 511 are driven by a co-axial gear 515 which when operative engages with a pinion 516 which is driven by a gear 517 which is a part of the gear train of the apparatus which, of course, also drives the claw 60.

A recess 518 is provided in the front wall of the apparatus adjacent the sprocket 511. Recessible plate 514 is pivotally movable upon a shaft 519 which corresponds to shaft 307 of Figure 9. A post 520 extends upwardly within the film compartment. Operating connection between this post and the recessible plate 514 is similar to that described in connection with Figures 9, 10 and 11. Thus, as a magazine is inserted within the compartment 510, its lower surface engages the rod 520, and through the slots 521 and 522 cams the delivery sprocket 511 into the recess 518 thereby removing gear 515 from pinions 516 and breaking the drive for the sprocket. Similarly the take-up sprocket 511 is recessed. When the magazine is removed, a spring 523 similar to 343 of Figure 10 acting on slide 524 similar to 336 forces the sprockets 511 back into operative position and the gears 515 into engagement with pinions 516. Springs 322 and 523 (see Figure 10) give sufficient resilience to the return of the recessible plate so that the teeth of the two gears mesh without interference. A slot 525 in the slide 524 permits the slide to move freely past a shaft 526 for the gear 517. The latch 90 of Figure 16 may be locked against unlocking in the manner previously taught.

It will be understood from the foregoing portion of this description that the magazine which is inserted within compartment 510 may be of any desired type. In Figure 17 we show a particular form of magazine in which compensation is secured by continuously rotating sprockets which may be used with the mechanism of Figure 16 if desired.

Within a substantially quadrilateral magazine 535 there are provided a gate recess 536, guides 537 and 538, and sprockets both designated as 540 rotating in suitable bearings, not shown, in the floor of the magazine body 541 and fastened to gears 542 which are disposed on the exterior surface of the magazine body and upon insertion within the film compartment engage and mesh with the pinions 516 of Figure 16. The connections between the sprockets and gears are suitably light-trapped. The teeth upon gears 542 are extremely fine so that they may readily mesh with those of pinions 516. The film 8f passes from a delivery core 118 around the delivery sprocket 540 and, guided by a curved portion of guide 537, in a loop formed at 543, and through the gate recess 536 guided by channels formed by guides 537 and the front wall of the body 544. The film is then passed in similar manner to the take-up core 119.

As this magazine is pressed into place, the sprockets 511 are cammed out of the way and the sprockets 540 of the magazine 535 placed in driven relation to the drive formerly employed for the sprockets 511 for the film 88f upon open reels 14.

As shown in Figures 18, 18a, and 18b, instead of sprockets movable in a direction normal to their axes and into recesses, we may prefer by the insertion of a magazine to depress them along their axes into the body of the apparatus.

As in connection with Figure 16, we describe only the delivery sprocket unit of Figure 18, the take-up unit being identical except that it is frictionally driven as previously described. Delivery sprocket 545 mounted on gear 546 is engaged by pinion 547 which is driven by a large gear 548 which in turn is driven by the mechanism of the camera as heretofore described. Sprocket 545 and gear 546 are hollow and freely rotate on a fixed shaft 549 supplied with grooves 550. The shaft 549 has a head 551 which holds the sprocket 545 in its proper operative position for film supported on open reels. The shaft is rigidly mounted at 552 on a bearing plate 553. The sprocket 545 and its gear 546 may pass freely through an opening 557 in the film compartment floor 558 and bearing plate 554. A spring 559 normally holds this assembly in its operating position for a film mounted upon open reels. Upon the insertion of a magazine, the delivery sprocket is depressed and gear 546 disengaged from pinion 547. At the same time rod 560 is depressed, thereby disengaging the latch lock by means heretofore described in connection with Figures 9 and 10 and illustrated therein. Figure 18a shows a sprocket unit in the operative position for a film supported by open reels and Figure 18b in such position for a film within a magazine.

Since the teeth of the gears 546 and 547 are fine, upon the upward movement of the movable portion of the sprocket connection, they re-engage generally without difficulty. If they do not, a user twists the sprocket slightly to cause re-engagement. In a more expensive construction, helical gears may be substituted. In that case, re-engagement will be certain without any manipulation. A guide 561 is mounted on a sleeve 562 with an offset bracket to clear the gear 546 which is prevented from rotating around the shaft 549 by means of a pin 563 engaging with the groove 550.

In this embodiment of this invention, any type of magazine may be used, as, for example, one with resilient compensating and guiding means such as shown in Figure 1b. A magazine shown in Figure 18b, however, is of the Thornton type and particularly adapted to cooperate with the structure above described. A sprocket 570 disposed within a magazine 571 is revoluble with a thin flat gear 572 disposed upon the outside of the lower wall 573 of the magazine. Pinion 574 which engages and drives gear 575 attached to the sprocket when the sprocket is in operative position is relatively wide, and, when a magazine is in operative position and the sprocket depressed, makes driving contact with the gear 572, thereby, upon the operation of the apparatus, driving the sprocket 570.

In another preferred form of our invention, as shown in Figure 19, we may prefer to drive a sprocket within a magazine of the Thornton type by direct contact with the depressed sprocket of the apparatus itself, this latter sprocket always remaining in driving contact with the power spring 18.

A sprocket 580 within a magazine 581 may be mounted as previously described with a driven member 582 of a motion-transmitting clutch disposed upon the outer side of the lower wall 583 of the magazine. This driven member may take any desired form, as, for example, a mitre gear with the angle of inclination of the teeth to the axis of the gear relatively steep. Similarly, the driving member may be an internal gear 584 with teeth formed to engage those of the driven member.

As in the form of our invention described immediately hereinabove, a delivery sprocket 585 for a film mounted upon open reels may be mounted on gear 586 which is engaged by a pinion 587, which in this instance is relatively wide. This pinion is driven by a large gear 588 which, in turn, is driven by a camera mechanism as heretofore described. Sprocket 585 and gear 586 are hollow and freely rotate on a fixed shaft 589, supplied with grooves 590. A head 591, and a collar 592, similar to 562 of Figure 18b, hold this shaft between bearing plates 593 and 594. A spring 595, shown depressed in Figure 19, normally holds the sprocket in its operating position for a film mounted upon open reels.

Since the assembly, including a sprocket associated with the take-up mass, is the same as that for the delivery mass except that it may be frictionally driven as heretofore described, it is not illustrated or described.

In the embodiments of this invention previously described, we have shown film handling apparatus in which there may be inserted interchangeably film of different widths as for example that of the type known as double eight, hereinbefore designated as 8f, supported on open reels 14, or film of the type known as single eight, hereinbefore designated as 8f, mounted within a magazine. Our invention is equally applicable, however, to apparatus in which films differing in width or in other characteristics all may be mounted upon open reels instead of within magazines. The introduction of the reel for films of one characteristic clears the compartment of devices for the guiding and feeding of films of other characteristics mounted upon other reels.

In Figures 20 and 20a we show an embodiment of our invention in which relatively wide film, as for example a double eight film, supported upon open reels 14 of relatively small diameter shown in full line in Figure 20 and a narrow film, as for example a single eight film, supported upon open reels 600 of relatively large diameter may be interchangeably inserted within a film compartment. In order to secure the same number of images or "frames" to be exposed or projected, the narrower film is shown as mounted upon a reel 600 of twice the capacity of the reel 79 carrying the wider film. By the insertion of a narrow film supported upon open reels 600 into a film compartment the guiding means for a wider film supported upon open reels 14 are moved out of the way.

In Figure 20 we show for example a camera similar to those heretofore described and illustrated as in Figures 9 and 10. We show a film compartment 601 with a delivery spindle 79 and a take-up spindle 39 with a light-tight cover 602, hinged at 603, which is locked by a latch 90 operated by a button 91, a delivery claw 60, which may be operated by means heretofore described, and a lens 85. Spindles 79 and 39 may be of the type described and claimed in the co-pending application Serial Number 238,406 filed November 2, 1938, by the applicant Foster and patented in the United Kingdom as Number 505,034.

As a wide film supported upon open reels 14 is inserted within the film compartment 601 the film is threaded around a delivery resilient compensating and guiding member 604, similar in construction to member 303 previously described in connection with Figure 9, which is mounted upon a recessible plate 605, pivoted at 606, which may be swung into a recess 607 or held in operative position by a stop 608. The film is then threaded through a gate which may consist of a fixed front section 75 and a movable rear section 77 mounted on a slide 100 with a stop 105 which when depressed permits the movable gate section to be removed as heretofore described in connection with Figures 4 and 9. Mounted upon the movable gate section 77 is a spring pressure plate 609. The film is then passed around a take-up resilient guiding and compensating member 610 mounted on a recessible plate 611, pivoted at 612, which may be swung into a recess 613 or held in operative position by a stop 614. The film is then attached to a take-up reel 14 mounted upon the take-up spindle 39. Upon the insertion of a film supported upon open reels 600, the delivery reel depresses a rod 615 which by means similar to those described heretofore in connection with Figures 9 and 10 swings the plates 605 and 611 into the recesses 612 and 613 respectively and out of the way of the reels 600. The relatively narrow film is threaded from the delivery reel through the gate to the take-up reel as hereinbefore described.

The spring pressure plate 609 may be formed with resilient guiding and compensating extensions in the shape of wings 616 and 617 in the form of leaf springs, as best shown in Figure 20a, which are bent backwardly and away from the gate and the path of a film supported upon the reel of smaller diameter. It will be noted that these wings are of only slightly greater width than that of the narrower film. Such compensating means for the film supported upon the larger reel may be of the form shown in the patent to Bundick et al. Number 2,036,918, dated April 7, 1936.

By the above means it will be seen that when the wider film is inserted within the camera it is guided by the recessible compensating members 604 and 610 as heretofore described and when the narrower film is inserted within the compartment 601 it is guided by the narrower guiding members 616 and 617 and the spring-pressed plate 609. Guiding members 616 and 617 are so shaped and disposed that they are inoperative when the wider film is passing through the gate. It will be understood that the spring pressure exerted by the pressure plate 609 will be of sufficient strength to hold the relatively narrow film in its correct position at the focal plane when the film is being intermittently fed through the gate.

If it is desired to spool wider film in longer lengths the width of the wings 616 and 617 may be correspondingly extended to the cover edge on both sides of the spring pressure plate 609. With an apparatus so made it is possible alternatively to insert within the film compartment films of both short and long lengths supported on reels of either width. Conversely if film of the narrower type is spooled in shorter lengths, it would be threaded around the compensating means 604 and 610 the dimensions of which would be correspondingly adjusted.

In previous embodiments of our invention we have described means for preventing the accidental opening of a cover of a film compartment as the operator has inserted within the film compartment a film supported upon open reels. In these previously described embodiments the auxiliary lock or latch-lock has been illustrated as actuated by the tension of the film acting on resilient guiding members or it has been automatically thrown out of engagement by the insertion of a magazine. In the embodiment of this invention illustrated in Figures 21, 21a, 22, 22a and 23 the operator actuates a latch-locking device upon the placing of a delivery reel upon its spindle. This latch-locking device is released when the operator depresses an auxiliary unlatching button as heretofore described and shown in Figures 4 and 9.

To illustrate this embodiment of our invention, we show a camera with a film compartment 620 in which is mounted a fixed gate section 75 and a movable gate section 77 carrying a spring pressed plate 78. The gate is closed or moved into operative position by the actuation of a latch 621 by means described and illustrated heretofore. A delivery reel 14 may be mounted upon a delivery spindle 622 mounted upon a bearing plate 623. This spindle may consist of a lower portion 624, best shown in Figures 22 and 22a, rotatable but fixed against movement along the axis of rotation, and a relatively movable or expandable upper portion 625. The lower portion 624 is formed with a vertical slot 626 in which is mounted a cam or control member 627 pivoted at 628 which normally projects outside the periphery of the spindle. Extending downwardly from and fixedly mounted in the upper portion 625 is a T-shaped member 629 which is movable upwardly by the camming member 627 as it is pressed inwardly by the insertion of an open reel. A cylindrical recess 630 with a lip 631 having a threaded insert acts as a guide for the upwardly extending portion 632 of the T-shaped member 629. A coiled spring 633 acting between the lip 631 and the head of the T-shaped member 629 normally holds together the upper and lower portions 625 and 624 respectively of the spindle 622.

An annular groove 635 is formed adjacent the upper end of the upper portion 625 of the spindle. Upon the insertion of an open reel 14 as shown in Figure 22, its lower side plate cams inwardly the camming member 627. The right hand portion of this member as viewed in the drawings may also act as a lug to engage the usual driving deformation upon the interior of the reel. The upper portion 625 is thereupon expanded upwardly. Upon the closing of a cover 640 for the film compartment 620 hinged at 641 a projection 642 on a control lever 643 pivoted at 644 is moved in the direction of the arrow as shown in Figure 21. When the cover is latched shut in light-tight condition the projection 642 is in alignment with the annular groove 635 thus permitting the spindle to rotate freely without contact between the upper portion and the upper projection 642.

The above described movement of the lever 643 operates the latch-lock. As lever 643 is swung on its pivot 644 it moves a lug 645 adjacent its opposite end in the direction of the arrow as shown on Figures 21 and 21a. Lug 645 thereupon engages a lever 646 pivoted at 647 which is mounted on a rear wall 648 of the film compartment 620 and moves it in the direction of the arrow of Figure 21a. Mounted adjacent the end of lever 646 relatively distant from the reel is a resilient protuberance 649 which includes an irregularly formed locking lug 650. Movement of the lever 646 swings the locking lug 650 into the path of a pin 651 mounted on the latch 621 and extending through the rear wall of the camera to the latch operating button 91. When the latch is closed, the pin 651 rides over a beveled edge 652 of the locking lug 650 which thereupon locks the latch from accidental opening. Normally the lug 650 is held out of engagement with the pin 651 by a V-shaped projection 653 on the lever 646 in engagement with a deformation on a resilient member 654. When the lever 646 is moved into locking position, the V-shaped projection 653 moves into engagement with a suitable V-shaped recess 655 of the resilient member 654. This resilient member 654 is mounted on an unlocking lever 660 which is pivoted at 661 and has at its lower end as seen in Figure 21a an L-shaped projection 662 with a right-angled unlocking lug 663. At the upper end of the lever 660 an arm 664 is operated by the mechanism previously described in connection with Figure 9. Arm 664 rests on the beveled surface 372 (see Figure 9) of the collar 371 which is mounted on the rod 171 and fastened thereto by means of the set screw 370. Upon the inward movement of the rod 171 as the operator as previously described depresses the button 172 against the pressure of the spring 174, the arm 664 of the lever 660 is moved in the direction of the arrow as shown in Figure 21a. Simultaneously the lug 663 moves the resilient member 649 and the locking lug 650 out of engagement with the pin 651. At the same time also if desired by the devices heretofore described and shown in Figures 4 and 9 an identification mark may be made in the film at the gate by means of the knife 184. The cooperative action of the resilient member 654 between the levers 646 and 660 holds the arm 664 of the lever 660 against the beveled surface 372.

As clear from Figure 22a the core 118 of the magazine inserted within the film compartment 620 is free from the camming member 627. The spindle is therefore not expanded and the lever 643 does not come into engagement with the upper portion 625 of the spindle 622 and therefore the locking mechanism remains in inoperative position. Mounted on the cover 640 is a stop 671 (Figure 21) which limits the movement of the lever 643. A spring 672 normally holds the lever 643 in operative position.

From the above description, it will be seen that when the operator inserts film supported upon an open reel, the cover 640 is locked against accidental opening and in order to open the cover an auxiliary unlocking device must be depressed to release the latch-lock. Conversely when a magazine 15 is inserted within the film compartment 620 the latch-lock is not brought into operation and the operator is immediately free to open the latch and remove the magazine.

As the magazine 581 is placed within its compartment, contact between its wall 583 and the sprockets 585 of the apparatus depresses the sprockets as previously described in connection with Figures 18 and 18a and 18b. Gear 586 is continuously meshed with pinion 587 so that the sprocket 585 is still driven by the driving mechanism of the apparatus. Driving connection having been established between these sprockets and sprockets 580 of the magazine, the sprockets of the magazine are thereby driven by the apparatus. As previously described, a claw such as 60 feeds the film intermittently. At the same time a shaft not shown but corresponding to previously described shaft 320, as in Figures 9 and 10, may be used to operate the latch for the lock if desired.

Figure 24 shows a variant of the latch 148 previously described in connection with Figure 2. It may consist of a carrier or control member 691 having an arm 692 rightwardly extending as shown in the drawings for engagement with an extension 149 of a gate control slide similar to 107 shown in Figure 4. Attached to this member or if desired formed integrally with it is an irregularly shaped spring 693 one portion of which as at 694 is fixedly attached to the casing and another portion 695 of which is formed into a latch, corresponding to 148 embodying an extension 696 of resilient characteristics which engages the top of a magazine which is placed within the film-receiving compartment. As the arm 149 is moved downwardly as shown in the drawings it engages the control member 691 and cams it forwardly thus clearing the film compartment for the magazine to be inserted therewithin. As the latch is opened, however, and the lever 149 is moved to the position shown in the drawings the resilience of the member 693 forces the latch 695 into latching position. The resilient portion 696 which engages the top of the magazine is sufficient to compensate for any manufacturing irregularities and to hold the magazine firmly against the bottom of the film compartment.

Reference is made to our co-pending application, Serial No. 500,862, filed September 1, 1944, which is a continuation-in-part hereof and discloses certain of the structure shown herein. Means for control of back-winding, a light-trap for a gate-receiving recess of a magazine, and mechanism for mounting and handling the delivery and take-up cores within the magazine will be found therein.

The advantages of our invention will be clear from the above portion of this specification, the attached drawings, and the sub-joined claims. These advantages include the provision of simple and automatic apparatus in which a user without any attention upon his part may employ interchangeably as he wishes either a film supported by a magazine or a film supported upon open reels, thus obtaining the great advantage of automatic threading which is provided by the magazine and universal availability of films supported upon open reels.

We claim:
1. In combination, a film magazine and a self threading motion picture camera adapted for alternative use with a film housed within a magazine and a film coiled upon an open reel; said camera having a film-receiving compartment, spindles mounted within said compartment for supporting open reels therewithin, and guiding means engageable by the film and positioned within said compartment for directing the film through said camera, said guiding film-engaging means being so disposed in relation to the space within said compartment which is occupied by said magazine when said magazine is being placed therein that said means does not then engage said magazine and hence block its introduction into said compartment but engages and guides the film supported by said magazine said disposition of said guiding means also being such that when no magazine is disposed in said compartment but open reels are mounted therewithin it engages the film mounted upon said open reels and effectively directs it from one of said reels to the other thereof; means independent of said spindles for mounting the film within said magazine, means independent of said spindles for engaging a surface of said magazine for mounting it within said compartment as the magazine is placed therewithin, and guiding formations for directing the film housed within the magazine into operative relation with said guiding film-engaging means within said compartment as the magazine is placed in said compartment whereby a film housed within said magazine is automatically threaded by the introduction of the magazine into said compartment.

2. In combination, a magazine and a camera, said camera being adapted for alternative use with a film housed in a magazine and a film coiled upon open reels, a film-receiving compartment in said camera adapted for the alternative reception of said reels and said magazine, means within said compartment for mounting a magazine therewithin, means within said compartment separate from said mounting means for supporting open reels therewithin, a lens upon said camera, a plurality of guides for establishing alternative paths of travel within said compartment one for a film mounted upon open reels and another for a film housed within a magazine, a first of said guides being common to both of said paths and being so disposed that it alternatively positions said films at the focal plane of said lens, a second of said guides being peculiar to the path for a film mounted upon open reels, and a third of said guides being peculiar to the path for a film mounted within the magazine, and a pull-down for alternatively engaging said films for alternatively intermittently advancing said films along said focal plane.

3. In a camera adapted for alternative use with a film housed in a magazine or a film supported upon open reels, a film-receiving compartment adapted for the alternative reception of said reels and said magazine, means within said compartment for mounting a magazine therewithin, means within said compartment for alternatively supporting open reels therewithin, a lens, a plurality of guides, a first of said guides being disposed at the focal plane of said lens, a second of said guides being so disposed that when a magazine is mounted within said compartment it cooperates with said first guide to form a first work-path for a film supported by the magazine, said work-path including said focal plane, a third of said guides being so disposed that when open reels are mounted in said compartment it cooperates with said first guide to form a second work-path different from said first work-path but including said focal plane, a pull-down for alternatively engaging a film housed within a magazine or a film supported upon open reels for intermittently advancing said films along said first and second work-paths respectively and alternatively and along said focal plane, and means for alternatively taking up either of said films after it has been so advanced along said focal plane.

4. In combination, a film magazine and a camera adapted for alternative use with a film supported upon open reels and a film housed in a magazine; said magazine having a delivery core and a take-up core; said apparatus having a film-receiving compartment adapted for the alternative reception of said reels and said magazine, means within said compartment for mounting the magazine therewithin, a delivery spindle within said compartment for supporting an open reel thereupon, a take-up spindle within said compartment for supporting an open reel thereupon, a lens, a member projecting within said compartment for alternatively cooperating with a film positioned within said compartment supported by an open reel and a film housed in a magazine for positioning the film at the focal plane of said lens at which said film is exposed, film-engaging means disposed within said apparatus when the film is supported upon open reels therewithin for directing said film from said delivery spindle to said focal plane and from said focal plane toward said take-up reel, said film-engaging means and said member thereby defining a work-path for a film between said reels which includes said focal plane, guiding instrumentalities within said magazine and disposed relatively adjacent said focal plane when the magazine is disposed within the apparatus for directing the film from said delivery support to said focal plane, guiding instrumentalities within said magazine and disposed adjacent said focal plane when said magazine is disposed within the apparatus for directing the film from said focal plane toward said take-up core, said guiding instrumentalities thereby cooperating with said plane-determining member to create a work-path for the film, said work-path being different from said previously defined work-path, between said delivery core and said take-up core which includes said focal plane, a pull-down alternatively engaging said films for alternatively intermittently advancing said films along said focal plane, and common driving means for said pull-down and said take-up core of said magazine and said take-up spindle of said apparatus.

5. In a camera adapted for alternative use with a film supported upon open reels and a film housed within a magazine; said magazine having a delivery core, a take-up core, means therebetween for exposing a film extending therebetween, and means within the magazine for mounting said cores therewithin independently of devices upon the camera; said camera having a film-receiving compartment adapted for the alternative reception of said open reels and said magazine, a delivery spindle within said compartment for supporting an open reel thereupon, a take-up spindle within said compartment for supporting an open reel thereupon, means independent of said spindles and disposed within said compartment for engaging a surface of said magazine for mounting it within said compartment, the magazine being formed with openings for the reception of said spindles and said delivery core being so mounted that when said magazine is placed within said compartment said delivery spindle does not engage therewith and hence is free of interference therewith, connective instrumentalities disposed between said take-up spindle and said take-up core of the magazine when the magazine is mounted within said compartment for transmitting the movement of said take-up spindle to said take-up core, a lens, a single guiding member projecting within said compartment for alternatively cooperating with the film positioned within said compartment supported by an open reel and the film housed within the magazine for positioning the film at the focal plane of said lens at which the film is exposed, said member said mounting means and said exposing means of said magazine being so disposed thereupon that as said magazine is placed in said compartment the film is thereupon automatically placed in said focal plane ready for exposure and said guiding member also being so disposed within said compartment in relation to the space therewithin occupied by said magazine that it does not engage said magazine thereby interfering with its positioning therewithin and that alternatively when a magazine is not disposed therewithin it effectively directs a film mounted upon said open reels from one reel to another thereof and along said long focal plane, a pull-down engaging said film for intermittently advancing the film along said focal plane, and common driving means for said pull-down and said take-up spindle.

6. In a camera adapted for alternative use with a film supported upon open reels and a film housed within a magazine; said magazine having a delivery core, a take-up core, means including an opening therebetween for exposing a film extended therebetween, guiding formations, one upon each side of said opening, for directing the film thereacross whereby it bridges the exposure opening, and means for mounting said cores therewithin independently of devices upon the camera; said camera having a film-receiving compartment adapted for the alternative reception of said open reels and said magazine, a delivery spindle within said compartment for supporting an open reel thereupon, a take-up spindle within said compartment for supporting an open reel thereupon, means independent of said spindles and disposed within said compartment for engaging a surface of said magazine for mounting it within said compartment, the magazine being formed with openings for the reception of said spindles and said delivery core being so mounted that when said magazine is placed within said compartment said delivery spindle does not engage therewith and hence is free of friction therewith, connective instrumentalities disposed between said take-up spindle and said take-up core of the magazine when the magazine is mounted within said compartment for transmitting the movement of said take-up spindle to said take-up core for driving said take-up core, a lens, a single guiding member projecting within said compartment for alternatively cooperating with the film positioned within said compartment supported by an open reel and the film housed with the magazine for positioning the film in the focal plane of said lens at which the film is exposed as it bridges the exposure opening, said member said mounting means and said exposure opening of said magazine being so disposed that as said magazine is placed in said compartment the film is thereupon automatically placed in said focal plane ready for exposure, and said guiding member also being so disposed within said compartment in relation to the space therewithin occupied by said magazine that it does not engage said magazine as it is being placed in said compartment thereby interfering with its positioning therewithin and that alternatively when a magazine is not disposed therewithin it effectively directs a film mounted upon said open reels from one reel to another thereof and along said long focal plane, a pull-down engaging said film for intermittently advancing the film along said focal plane, and common driving means for said pull-down and said take-up spindle.

7. In a camera adapted for alternative use with a film supported upon open reels and a film housed in a magazine; said magazine having a delivery core, a light-tight tube upon which said delivery core is mounted for free revolution thereupon, a take-up core, a mounting extending from a wall of the magazine for mounting said take-up core independently of the camera, and means between said cores for exposing a film extending therebetween, said camera having a film-receiving compartment adapted for the alternative reception of said reels and said magazine, a delivery spindle of a diameter less than the diameter of said tube of said magazine within said compartment for supporting an open reel thereupon, means independent of said spindles within said compartment for mounting a magazine therewithin, a take-up spindle within said compartment for supporting an open reel thereupon, said tube which serves as mounting for said delivery core being so disposed that when the magazine is placed upon its mounting means within said film compartment said delivery spindle extends within said tube without contact therewith and said take-up core being so disposed that when the magazine is placed upon its mounting means within said compartment said take-up core is disposed about said take-up spindle, connective instrumentalities disposed between said take-up spindle and said take-up core of the magazine when the magazine is mounted within said compartment for transmitting the movement of said take-up spindle to said take-up core, a lens, guiding means including a member projecting within said compartment for cooperating with a film positioned within said compartment supported by open reel and alternatively with a film housed in a magazine for positioning the film at the focal plane of said lens at which said film is exposed, said member, said mounting means, and said exposing means of said magazine being so disposed that as said magazine is placed in said compartment the film is thereupon automatically placed in said focal plane ready for exposure and said guiding means being so disposed in relation to said magazine that while alternatively cooperating with a film carried by an open reel or a magazine it interferes with the positioning of neither thereof within said compartment, a pull-down engaging said film for intermittently advancing said film along said focal plane, and common driving means for said pull-down and said take-up spindle.

8. In combination, a film magazine and a film handling apparatus; said apparatus having a film-receiving compartment and a spindle therewithin adapted for the mounting thereupon of an open reel alternatively to the use of a magazine with said apparatus; said magazine having a light tight tube extending therethrough and a film support surrounding and journaled directly upon said tube; and means for mounting said magazine within said compartment, said mounting means, said spindle and said tube being so disposed that when said magazine is mounted within said compartment said spindle passes within said tube and out of engagement therewith whereby said spindle may revolve freely and without contact with said magazine.

9. In a camera adapted for alternative use with a film supported upon open reels and a film housed within a magazine; said magazine having a delivery core, a take-up core, means therebetween for exposing a film extending therebetween, and means within the magazine for mounting said cores therewithin independently of devices upon the camera; said camera having a film-receiving compartment adapted for the alternative reception of said reels and said magazine, a delivery spindle within said compartment for supporting an open reel thereupon, a take-up spindle within said compartment for supporting an open reel thereupon, means independent of said spindles within said compartment for mounting a magazine therewithin, the magazine being formed with openings for the reception of said spindles, connective instrumentalities disposed between said take-up spindle and said take-up core of the magazine when the magazine is mounted within said compartment for transmitting the movement of said take-up spindle to said take-up core, a lens, a member projecting within said compartment for alternatively cooperating with a film positioned within said compartment supported by an open reel and a film housed within a magazine for positioning the film at the focal plane of said lens at which the film is exposed, said spindles being so disposed in said compartment that the peripheries of reels mounted thereupon are substantially in line with said focal plane whereby the film may readily be led thereto and therefrom and into and from engagement with said positioning member, said member said mounting means and said exposing means of said magazine being so disposed that as said magazine is placed in said compartment the film is thereupon automatically placed in said focal plane ready for exposure, a pull-down engaging the film for intermittently advancing the film along said focal plane, and common driving means for said pull-down and said take-up spindle.

10. In a film handling apparatus adapted for the alternative reception of a film of pre-determined characteristics coiled upon an open reel and a film of other characteristics housed within a magazine, said magazine having a delivery support and a take-up support for a film of said other characteristics and a first guiding means disposed therewithin for directing the film housed therewithin from one of said supports toward the other thereof, a film compartment adapted for the alternative reception of open reels and said magazine, a delivery spindle and a take-up spindle within said compartment for the reception of open reels for films of said pre-determined characteristics, a second guiding means normally disposed within said compartment having film contacting surfaces adapted to guide said film having said pre-determined characteristics and disposed upon open reels, a third guiding means disposed within said compartment in a position and having surfaces adapted to guide either of said films, a movable support for said second guiding means upon which it may be bodily removed from said compartment leaving it free for the reception of said magazine whereby the film support therewithin is guided within said apparatus by said first guiding means of said magazine and said third guiding means of said apparatus, means for moving said support, and an actuating member connected to said moving means for operating said moving means thereby removing said second guiding means from said compartment whereby a film housed upon open reels may be directed between said spindles by said second and third guiding means.

11. In a film handling apparatus adapted for alternative use with a film housed in a magazine and a film supported upon open reels, a film-receiving compartment adapted for the alternative reception of said reels and said magazine; said magazine having therewithin a delivery support, a take-up support, a film-engaging guide therebetween, and means rendering a film therewithin accessible to a pull-down of a film handling apparatus; said apparatus having a film-receiving compartment, a delivery support and a take-up support for open reels within said compartment, a film-engaging guide adapted for use with a film supported upon open reels, bodily movable supporting means for said guide normally positioned within said compartment, means for bodily moving said supporting means from a first position within said film compartment wherein it is adapted to contact a film supported upon open reels and wherein said guide supported thereupon interferes with said magazine and a second position out of said compartment and out of the way of said magazine, a pull-down extending to a position within said compartment for alternatively intermittently advancing a film housed within said magazine and one supported upon an open reel, means for driving said take-up supports, and an actuating member operatively connected to said supporting means and operated by the introduction of said magazine within said compartment for moving said supporting means from said first to said second position thereby clearing said compartment for the reception of said magazine.

12. In a film handling apparatus adapted for the alternative use of a film supported upon an open reel and a film supported and housed in a magazine, a film compartment, a plurality of guiding means within said compartment some of which are adapted to contact and guide a film supported upon an open reel and others of which are adapted to contact and guide a film within a magazine, and means connected to said guiding means which are adapted to cooperate with one of said films and operable upon the introduction of the support for the other of said films for removing said first mentioned guiding means from position within said compartment ready for the reception of the support for the other of said films.

13. In a film handling apparatus adapted for the alternative reception of a film housed in a magazine and a film supported by an open reel, a film compartment, means for mounting an open reel within said compartment, means for mounting a magazine within said compartment, bodily movable guiding means disposed within said compartment and adapted to contact a film supported upon an open reel, means for removing said movable guiding means from said compartment, and an actuating member connected to said removing means and operated by the positioning of said magazine within said film compartment for removing said guiding means for a film upon an open reel from said compartment and out of the way of said magazine.

14. In a film handling apparatus adapted for the alternative use of films mounted upon supports of different dimensions, a film compartment, means for mounting said supports within said compartment, a guide bodily movable between a first position within said compartment wherein it is disposed in guiding position for one of said films when the support therefor is positioned therein and a second position therewithout, and operating means connected to said movable guide and operated by the positioning of the other of said supports within said compartment for moving said guide from said first to said second position.

15. In a film handling apparatus adapted for the alternative use of each of a plurality of films each of a different width and each mounted upon a support of different dimensions, a film compartment, means for alternatively mounting said supports within said compartment, a plurality of guiding means within said compartment some of which are adapted to contact and guide a film of one of said widths and others of which are adapted to contact and guide a film of another of said widths, and means connected to said guiding means which are adapted to cooperate with films of one of said widths and operable by the introduction of the support for films of the other of said widths for removing said first mentioned guiding means from position within said compartment ready for the reception of the support for the other of said films, said guiding means for the other of said films remaining disposed within said compartment for use therewith.

16. In a film handling apparatus adapted for the alternative use of a film housed within a magazine and a film coiled upon an open reel, a film compartment, a support therein for an open reel, a member defining the focal plane of the apparatus and having an exposure opening, a pull-down for intermittently feeding a film in relation to an open reel upon said support past said exposure opening, a member engaging the film being fed in relation to said open reel between said intermittent pull-down and said reel for compensating for the difference in character of movement, a bodily movable support for said compensating member, and means for bodily moving said support between a first position wherein said compensating member is disposed within said compartment in position to engage the film supported upon an open reel and a second position wherein said compensating member is disposed therewithout and out of the way of a magazine which may be inserted in said compartment.

17. In a film handling apparatus adapted for the alternative use of a film housed within a magazine and a film coiled upon an open reel, said magazine having delivery and take-up supports for the film therewithin, a film-receiving compartment, delivery and take-up spindles for open reels within said compartment, means for mounting a magazine in operable position within said compartment, a pull-down for alternatively intermittently advancing a film housed within said magazine when mounted within said compartment and a film supported upon open reels when disposed upon said supports within said compartment, a resilient tensioning member for compensating for the difference in character of movement between said delivery and take-up spindles for said open reels and said intermittent pull-down, a support for said tensioning member bodily movable between two positions in a first of which said tensioning member is disposed within said compartment and accessible to a film supported upon open reels and in a second of which it is disposed out of said compartment and out of the way of a magazine, and means operated by the magazine as it is placed within said compartment for moving said tensioning member from the first of said positions to the second thereof.

18. In a film handling apparatus, a film-receiving compartment, a pull-down for intermittently advancing a film therewithin, a compensating member disposed therewithin for cooperating with said pull-down, a support for said compensating member upon which said compensating member is bodily movable between an operative position within said compartment and an inoperative position therewithout, means for maintaining said support fixed in operative position during the operation of said compensating member upon the film, and a guide upon which said support is movable between said operative and inoperative positions.

19. In a film handling apparatus, a film compartment, an intermittent pull-down extending therewithin for engaging a film, a compensating member normally disposed within said compartment and having a film contacting surface adapted to engage a film adjacent said intermittent pull-down for cooperation therewith, a movable support upon which said compensating member may be bodily removed from said compartment, means for moving said support, and an actuating member for operating said moving means thereby removing said compensating member from said compartment.

20. In a film handling apparatus, a film compartment, a pull-down extending within said compartment for intermittently advancing a film, a compensating member normally disposed within said compartment and having a film contacting surface engaging the film adjacent said intermittent pull-down for cooperating therewith, means for resiliently maintaining said film contacting surface in engagement with the film, a movable support upon which said compensating member may be bodily removed from said compartment, means for moving said support, and means independent of said resilient means for operating said moving means to move said member to its position within said compartment after it has been removed therefrom.

21. In a film handling apparatus, a film-receiving compartment, a compensating member disposed therewithin, a mounting for said compensating member upon which said compensating member is bodily movable from a position within said compartment to one without said compartment, a guide upon which said support may be moved between said positions, and a plate attached to said support and adjacent an edge of said compensating member and so formed and disposed as to cooperate with an edge of the film for holding it in constant lateral relation to said tensioning member and also as an instrumentality by which said support may be moved upon said guide.

22. In a film handling apparatus having a film-receiving compartment, two supports therein for continuously moving masses of film and a pull-down extending therewithin for intermittently advancing the film from one of said supports to the other thereof, means for compensating for the difference in character of movement of one of said masses and said intermittent feeding member, a support upon which said compensating means is mounted, a pin upon which said support is rotatable from position within said compartment to one therewithout, operating mechanism for so rotating said support from one of said positions to another thereof, and an actuating member for said operating mechanism.

23. In a film handling apparatus having a film-receiving compartment, supports for continuously moving masses of a film disposed therein, and an intermittently moving feeding member extending therein and so disposed that it engages the film between said supports, a resilient tensioning member for compensating for the difference in the character of movement between one of said masses and the said intermittent member, a guiding formation disposed along a line parallel to the transverse plane of said film as it extends between said supports, and a mounting for said tensioning member, said mounting being bodily movable upon said formation between two positions in a first of which said tensioning member is disposed within said compartment and in a second of which it is disposed out of said compartment.

24. In a film handling apparatus having a film-receiving compartment, supports for continuously moving masses of a film disposed therein, and an intermittently moving feeding member extending therein and so disposed that it engages the film between said supports, a resilient tensioning member for compensating for the difference in the character of movement between one of said masses and the said intermittent member, a guiding formation disposed along a line parallel to the transverse plane of said film as it extends between said supports, a mounting for said tensioning member, said mounting being bodily movable upon said formation between two positions in a first of which said tensioning member is disposed within said compartment and in a second of which it is disposed out of said compartment, and a spring compressible by movement from said first to said second position for returning said support and the tensioning member thereby from said second to said first position.

25. In a film handling apparatus, a film compartment, means within said compartment for supporting a delivery and a take-up mass of film therewithin, a pull-down for intermittently advancing the film from one of said masses to the other thereof, a resilient member engaging the film between one of said masses and said intermittent pull-down for compensating for the difference in character of movement of each thereof, a plate upon which said resilient member is mounted, said plate including a surface which engages an edge of the film for guiding it, a support upon which said plate and tensioning member may be bodily moved from a first film engaging position within said compartment and a second inoperative position therewithout, said support being movable from said first to said second position, and a spring for returning said plate and tensioning member from said second to said first position.

26. In a film handling apparatus, a film compartment, means within said compartment for supporting a delivery and a take-up mass of film therewithin, a pull-down for intermittently advancing the film from one of said masses to the other thereof, a resilient member engaging the film in the plane between one of said masses and said intermittent pull-down through which the film travels for compensating for the difference in the character of movement of each thereof, two plates disposed at right angles to said plane, means for holding said plates in parallel relation and spaced a distance slightly greater than the width of said tensioning member, said resilient member being attached to said plates for bodily movement therewith, said plates also serving both as edge guides for a film passing over said tensioning member and assisting in the support of said tensioning member, and a post upon which said plates, said separating means, and said tensioning member may be bodily moved from a position within said compartment to one therewithout.

27. In a film handling apparatus adapted for the alternative use of a film housed within a magazine and one coiled upon an open reel, a film-receiving compartment, supports within said compartment for open reels, means for mounting a magazine within said compartment, a pull-down for alternatively intermittently advancing a film housed within the magazine when mounted within said compartment and a film supported upon open reels when disposed upon said supports within said compartment, a continuously operating sprocket for maintaining an unsupported loop of slack in the film coiled upon open reels, a support for said sprocket bodily movable between two positions in a first of which said sprocket is disposed within said compartment and accessible to a film supported upon open reels and in a second of which it is disposed out of said compartment and out of the way of the magazine, and means operated by the magazine as it is placed within said compartment for moving said support from the first of said positions to the second thereof whereby said sprocket is removed from said compartment as the magazine is mounted therewithin.

28. In a film handling apparatus adapted for the alternative use of a film housed within a magazine and one coiled upon an open reel, a film-receiving compartment, supports within said compartment for open reels, means for mounting a magazine within said compartment, a pull-down for alternatively intermittently advancing a film housed within the magazine when mounted within said compartment and a film supported upon open reels when disposed upon said supports within said compartment, a continuously operating sprocket for maintaining an unsupported loop of slack in the film coiled upon open reels, a support for said sprocket bodily movable between two positions in a first of which said sprocket is disposed within said compartment and accessible to a film supported upon open reels and in a second of which it is disposed out of said compartment and out of the way of a magazine, and means rendered operable by a magazine as it is removed from said compartment for moving said support from the second of said positions to the first thereof whereby the removal of said magazine from said compartment prepares it for the reception and handling of a film coiled upon an open reel.

29. In a film handling apparatus adapted for the alternative use with a film housed within a magazine and one coiled upon an open reel, a film-receiving compartment, supports within said compartment for open reels, means for mounting the magazine within said compartment, a pull-down for alternatively intermittently advancing a film housed within the magazine when mounted within said compartment and a film supported upon open reels when disposed upon said supports within said compartment, a continuously operating sprocket for maintaining an unsupported loop of slack in the film supported upon said open reels, driving means for said sprocket, a support for said sprocket bodily movable between two positions in a first of which said sprocket is disposed within said compartment and accessible to a film supported upon open reels and in a second of which it is disposed out of said compartment and out of the way of the magazine, means effective when said sprocket is disposed in the first of said positions for driving said sprocket, common driving mechanism for said pull-down and said sprocket driving means, and means operated by the magazine as it is placed within said compartment for moving said support from the first of said positions to the second thereof.

30. In a film handling apparatus, a film-receiving compartment, supports within said compartment for continuously moving masses of a film, a pull-down for alternatively intermittently advancing a film from one of said supports to the other thereof, a continuously operating sprocket for maintaining an unsupported loop of slack in the film between one of said supports and said pull-down, a support for said procket bodily movable between two positions in a first of which said sprocket is disposed within said compartment and accessible to a film carried by said supports and in a second of which it is disposed out of said compartment and inaccessible by the film, and means for bodily moving said sprocket from one of said positions to the other thereof.

31. In a film handling apparatus, a film-receiving compartment, a delivery support and a take-up support disposed therewithin, a movable film guide disposed therewithin for directing a film from one of said supports toward the other thereof, said guide embodying a film-contacting surface and a supporting body, and a mounting for said body upon which said guide is bodily movable between a first position within said compartment wherein said film-contacting surface is so disposed that it engages the film between said supports and a second position without said compartment and in a space formed in said apparatus and communicating therewith wherein said compartment is clear of said guide after said guide has been moved to said second position.

32. In a film handling apparatus, a film-receiving compartment, a delivery support and a take-up support disposed therewithin, means therebetween for establishing the focal plane of said apparatus, a film guide disposed therewithin for directing a film from one of said supports toward the other thereof, a mount for said guide upon which said guide is bodily movable between a first position within said compartment wherein said film contacting surface is so disposed that it engages the film between said supports and a second position therewithout wherein said compartment is clear of said guide and said guide no longer engages the film, and a post mounted upon said apparatus parallel to said focal plane upon which said mount is bodily movable in a direction parallel to the axis of said post between said positions.

33. In a film handling apparatus, a film-receiving compartment, a delivery support and a take-up support disposed therewithin, a film guide disposed therewithin for directing a film from one of said supports toward the other thereof, a mount for said guide upon which said guide is bodily movable between a first position within said compartment wherein said film contacting surface is so disposed that it engages the film between said supports and a second position therewithout wherein said compartment is clear of said guide, an actuating member, and operating mechanism extending between said actuating member and said mount for moving said mount from one of said positions to the other thereof by the movement of said actuating member.

34. In a film handling apparatus, a film-receiving compartment, a delivery support and a take-up support disposed therewithin, a film guide disposed therewithin for directing a film from one of said supports toward the other thereof, a mount for said guide upon which said guide is bodily rotatable between a first position within said compartment wherein it engages the film between said supports and a second position therewithout wherein said compartment is clear of said guide, means for rotating said mounting from one of said positions to the other thereof, and an actuating member operatively attached to said rotating means for operating said rotating means upon the movement of said actuating member.

35. In a film handling apparatus adapted for alternative use with a film housed within a magazine and a film supported upon open reels, a film-receiving compartment, a delivery support and a take-up support for said open reels disposed therewithin, a film guide disposed therewithin for directing a film supported upon open reels from one of said supports toward the other thereof, a mount for said guide upon which said guide is bodily movable, said guide embodying a camming surface so disposed that when said magazine is placed within said compartment it engages said camming surface and moves said guide out of said compartment thereby rendering said compartment clear of said guide and free for the reception of said magazine.

36. In a film handling apparatus, a film-receiving compartment, a delivery support and a take-up support disposed therewithin, a pull-down extending therewithin for intermittently feeding a film from one of said supports toward the other thereof, a member having a film guiding surface engaging the film between said pull-down and one of said supports, a first spring for resiliently holding said member against the film, a hinge in said mount upon which said member is bodily movable from a first position within said compartment to a second position therewithout, and a second spring for returning said mount to said first position after it has been moved to said second position.

37. In a film handling apparatus adapted for the alternative use with a film housed within a magazine and one coiled upon an open reel, a film-receiving compartment, means for alternatively mounting an open reel and a magazine within said compartment, a film-engaging member for advancing a film coiled upon the open reel, means for driving said film-advancing member, and mechanism actuated by the positioning of said magazine within said compartment for disabling said driving mechanism whereby said film-advancing member for a film supported upon an open reel is rendered inoperative while said magazine is disposed within said compartment.

38. In a film handling apparatus adapted for alternative use with a film housed within a magazine and one coiled upon an open reel, a film-receiving compartment, means for alternatively mounting an open reel and a magazine within said compartment, a film engaging member for advancing a film coiled upon an open reel, means for driving said film advancing member, and mechanism actuated by the removal of said magazine from said compartment for actuating said driving mechanism whereby said film advancing member for a film supported upon an open reel is rendered operable while said magazine is not disposed within said compartment.

39. In a film handling apparatus adapted for the alternative use of a film housed within a magazine or a film coiled upon an open reel, a film-receiving compartment, supports within said compartment for open reels, means for alternatively positioning a magazine within said compartment, a pull-down for intermittently advancing a film housed within said magazine and alternatively a film supported upon open reels which are disposed upon said supports within said compartment, a continuously operating sprocket for maintaining an unsupported loop of slack in the film supported upon said open reels, powered means for driving said sprocket, means for disabling said powered means, and an actuating member operated by the introduction of said magazine within said compartment for operating said disabling means.

40. In a film handling apparatus, a film compartment, supports within said compartment for a film, a pull-down for intermittently advancing a film from one of said supports toward the other thereof, a continuously operating sprocket cooperating with said pull-down for maintaining a loop of slack in the film between said pull-down and one of said supports, a mount for said sprocket disposed upon said apparatus and bodily movable between a position within said compartment wherein said sprocket is adapted to engage a film for advancing it in relation to said intermittent pull-down and a position therewithout wherein said sprocket is without influence upon the film, means for moving said bodily movable mount from one of said positions to the other thereof whereby said sprocket may be alternatively disposed within or without said compartment, a power drive for said sprocket, and means operated by said moving means for disabling said power drive.

41. In a film handling apparatus, a film compartment, supports within said compartment for a film, a pull-down for intermittently advancing a film from one of said supports to the other thereof, a continuously operating sprocket cooperating with said pull-down for maintaining a loop of slack in the film between said pull-down and one of said supports, a mount for said sprocket disposed upon said apparatus and bodily movable between a position within said compartment wherein said sprocket is adapted to engage a film for advancing it in relation to said intermittent pull-down and a position therewithout wherein said sprocket is without influence upon the film, means for moving said bodily movable support from one of said positions to the other thereof whereby said sprocket may be alternatively disposed within or without said compartment, a power drive for said sprocket, and means operated by said moving means for rendering said power drive operative upon said sprocket when said sprocket is moved within said compartment.

42. In a film handling apparatus adapted for alternative use with a film housed within a magazine and one coiled upon an open reel, a film receiving compartment, supports within said compartment for open reels, means for mounting a magazine within said compartment, said magazine including supports for a delivery core and a take-up core of a film and means for compensating for the difference in character of movement between said cores and an intermittently moving member when engaging the film therebetween, means for mounting said magazine within said compartment, a pull-down for intermittently advancing the film housed within the magazine when the magazine is mounted within said compartment and alternatively a film supported upon open reels when open reels are disposed upon said supports within said compartment, a continuously operating sprocket for maintaining an unsupported loop of slack in the film coiled upon open reels, a power drive for said sprocket and said intermittent feeding member, means connecting said drive and said pull-down, means connecting said power drive and said sprocket, means for disabling said connecting means between said power drive and said sprocket while maintaining the drive of said pull-down by said powered means, and an actuating member for said disabling means operated by the introduction of said magazine within said compartment for operating said disabling means.

43. In a film handling apparatus adapted for alternative use with a film housed within a magazine having an opening for the reception of a mounting member of said apparatus and one coiled upon open reels, a film-receiving compartment adapted for the alternative reception of a magazine and a film coiled upon open reels, a film guide within said compartment adapted to cooperate with a film supported upon open reels when therewithin, said guide embodying a film-contacting portion and a support therefor, said support being bodily movable between a position within said compartment and one therewithout, and a combination mounting member for the magazine and guide for said support during its movement, said combination member extending within said compartment, the introduction of said magazine into said compartment being effective to move said guide along said combination member out of said compartment and said combination member thereupon extending into the opening of said magazine and being effective to engage said magazine and to assist in the positioning thereof within said compartment after said guide has been removed therefrom.

44. In combination, a film handling apparatus adapted for alternative use with a film housed within a magazine and one supported upon open reels and a magazine for use therewith; said apparatus having a film-receiving compartment for alternatively accommodating said magazine and open reels, a film-guide for directing the movement of a film supported upon open reels, a support upon which said film-guide is bodily movable between a position within said compartment and one therewithout, and a combination mounting member for the magazine and guide for said support during its movement extending within said compartment; said magazine having an opening for the reception of said combination member; the introduction of said magazine into said compartment being effective to move said film-guide along said combination member out of said compartment and said combination member thereupon being effective to assist in the positioning of said magazine within said compartment.

45. In a film handling apparatus adapted for alternative use with a film coiled upon open reels and one housed within a magazine having an opening for the reception of a mounting member of said apparatus, a film receiving compartment adapted for the alternative reception of the reels and the magazine, a compensating member within said compartment for modifying the movement of a film supported upon open reels, a support upon which said compensating member is bodily movable between a position within said compartment and one therewithout, and a combination mounting member for the magazine and guide for said support during its movement extending within said compartment, the introduction of said magazine into said compartment being effective to move said compensating member along said combination guide and mounting member out of said compartment and said combination member thereupon being effective to engage said magazine and to assist in the positioning of said magazine within said compartment.

46. A magazine for use in a film handling apparatus; said apparatus being adapted for alternative use with a film housed within a magazine and one coiled upon open reels and having a film-receiving compartment adapted for the alternative reception of a magazine and a film coiled upon open reels, a film guide adapted for a film disposed within said compartment and coiled upon open reels and bodily movable between an operative position within said compartment and an inoperative position therewithout, and a combination mounting member for said magazine and guide for said support during its movement; said magazine having means for the reception of said combination mounting and guiding member as the magazine is placed in said compartment as said film guide is removed therefrom whereby said combination member assists in the mounting of said magazine within said apparatus.

47. In a film handling apparatus adapted for alternative use with a film supported upon open reels and one housed within a magazine; said magazine having a delivery support and a take-up support, an aperture therebetween at which an intermittent pull-down may engage the film for intermittently advancing it from said delivery support toward said take-up support, and means engaging the film between said supports for compensating for the difference in character of movement between said supports and said intermittent pull-down; said apparatus having means for mounting a magazine therewithin, a delivery spindle and a take-up spindle for supporting reels, an intermittent pull-down so disposed that it engages and intermittently advances a film housed within a magazine and alternatively a film supported upon open reels which are disposed upon said spindles, a member so disposed that it engages a section of a film supported upon open reels which extends between one of said reels and said pull-down for compensating for the difference in character of movement therebetween, said compensating member being movable as the feeding of the film by said intermittent pull-down begins, means for frictionally and alternatively driving a reel upon said take-up spindle and said take-up support, a common drive for said intermittent pull-down and said frictional take-up drive, a cover for said compartment, a latch movable to a position wherein it locks said cover, means for locking said latch against movement from said locking position, a movable control member so disposed that it is engaged and moved by said compensating member as the feeding of a film supported upon open reels begins, a connection between said movable control member and said latch-lock operating means for operating said latch-lock upon the movement of said compensating member as the feeding of the film begins thereby preventing the inadvertent opening of said cover while film positioned upon an open reel is therein, and a manually operable release for said lock.

48. In combination, a film handling apparatus adapted for alternative use with a film supported upon open reels and one housed within a magazine and a magazine; said magazine having a delivery core and a take-up core, means therewithin for mounting said cores, an apertured member between said cores at which an intermittent pull-down may engage the film for intermittently advancing it from said delivery support toward said take-up support, means having instrumentalities engaging the film between said aperture and each of said supports for compensating for the difference in character of movement therebetween and an opening for the reception of a mounting member of said apparatus; and said apparatus having a film-receiving compartment, a delivery spindle and a take-up spindle within said compartment, an intermittent pull-down so disposed that it engages and intermittently advances a film housed within a magazine when within said compartment and alternatively a film supported upon open reels when disposed upon said spindles within said compartment, a member so disposed within said compartment that it engages that section of a film supported upon open reels which extends between a delivery reel and said pull-down for compensating for the difference in character of movement therebetween, a member so disposed within said compartment that it engages that section of said film which extends between said pull-down and said take-up reel for compensating for the difference in character of movement therebetween, a combined unitary supporting member for each of said compensating members and mounting member for said magazine, said compensating members being bodily movable by the pressure of a magazine as it is placed within said compartment between a first position within said compartment wherein the compensating member carried thereby is adapted to engage and modify the movement of a film supported upon open reels but wherein said compensating member interferes with the positioning of a magazine within said compartment and a second position outside of said compartment wherein it leaves said compartment free for the reception of the magazine, said combined unitary members being received within said openings of the magazine and cooperating with the surfaces thereof for positioning the magazine against movement in one plane, a member movable to and from a position wherein it holds said magazine against movement in a plane substantially normal to said previously mentioned plane, a spring for moving said compensating members from said second back to said first position as the magazine is removed, at least one of said compensating members also being movable upon its said support and relatively thereto as the feeding of a film supported upon open reels is begun, means for frictionally and alternatively driving a reel upon said take-up spindle and said take-up support, a common drive for said intermittent pull-down and said frictional take-up drive, a cover for said compartment, a latch movable to a position wherein it locks said cover, a connection between said latch and said holding member for operating said holding member concomitantly with the operation of said latch, means for locking said latch against movement from said locking position, a connection between said movable control member and said latch-lock operating means so disposed that it is engaged and moved by one of said compensating members as it moves as the feeding of the film begins, a manually operable release for said lock, means for placing a mark upon the film indicating the point in the travel thereof through the apparatus at which said releasing member has been operated, and an operating connecting between said film-marking means and said release member for operating said film-marking means upon the operation of said release.

49. In a film handling apparatus, a film compartment, a cover for said compartment, a latch for said cover, means for locking said latch in closed position thereby preventing the inadvertent opening of said latch and of said cover, a mounting for a film support within said compartment, means for feeding a film in relation to said support, a member engaging the film between said support and said feeding member and moved by the initiation of the feeding operation, and a connection between said film-engaging member and said latch-locking means for operating said latch-locking means upon the movement of said film-engaging member whereby the initiation of the film feeding operation prevents the inadvertent opening of said cover.

50. In a film handling apparatus, a film-receiving compartment, means for mounting a film support therewithin, a cover for said compartment, a latch for said cover, means for locking said latch against movement from locking position, an actuating member for said locking means so positioned that the introduction of said film support upon its mount engages said actuating member which thereupon operates said latch-locking means whereby inadvertent opening of said cover with a film therewithin disposed upon said support is prevented.

51. In a film handling apparatus adapted for alternative use with a film supported upon open reels and one housed within a magazine, a film-receiving compartment having means for alternatively mounting open reels and a magazine therewithin, a cover for said compartment, a latch for said cover, means for locking said latch against movement from locking position, and means operated by the insertion of an open reel upon its mounting means in said film compartment for operating said latch-locking means to lock said latch whereby inadvertent opening of said cover with a film therewithin disposed upon open reels is prevented.

52. In a film handling apparatus adapted for alternative use with a film supported upon open reels and one housed within a magazine, a film-receiving compartment having a spindle therewithin for the reception of an open reel and means for alternatively mounting a magazine therewithin, a cover for said compartment, a latch for said cover, means for locking said latch against movement from locking position, a control member mounted upon said spindle for bodily movement in relation thereto upon the introduction of said open reel upon said spindle, and a connection between said movable control member and said latch-locking means which operates said latch-locking means upon the insertion of said open reel upon its spindle whereby inadvertent opening of said cover with a film therewithin disposed upon open reels is prevented.

53. In a film handling apparatus, a film-receiving compartment having a spindle therewithin for the reception of an open reel, a cover for said compartment, a latch for said cover, means for locking said latch against movement from locking position, a control member mounted upon said spindle for bodily movement in relation thereto upon the introduction of said open reel upon said spindle, and a connection between said movable control member and said latch-locking means which operates said latch-locking means upon the movement of said control member as a reel is being placed thereupon whereby the insertion of said open reel upon its spindle operates said latch-locking means whereby inadvertent opening of said cover with a film therewithin disposed upon an open reel is prevented.

54. In a film handling apparatus adapted for alternative use with a film supported upon open reels and one housed within a magazine, a film-receiving compartment for the alternative reception of said open reels or said magazine, a spindle within said compartment for said open reels, said magazine having a film support with an opening greater in diameter than that of spindle whereby when said magazine is placed within said compartment said spindle does not contact said support within the magazine, a latch for said cover, a lock for preventing the inadvertent movement of said latch from locking position, a control member mounted upon said spindle for revolution therewith and movement relative thereto between a first position wherein it extends beyond the body of said spindle into engagement with the interior of said open reel but free from engagement with the interior of said support within said magazine and a second position within the interior of said spindle, a spring for moving said control member from said second to said first position, the introduction of said open reel upon said spindle being effective for moving said control member from said first to said second position, and an operating connection between said control member and said latch-locking means so disposed that the movement of said control member from said first to said second position operates said latch-locking means whereby inadvertent opening of said cover with a film therewithin disposed upon open reels is prevented.

55. In a film handling apparatus, a film-receiving compartment, a mount therewithin for a support for a film, a cover for said compartment, a latch for said cover movable between a first or open position wherein said cover may be closed and opened and a second or locking position wherein said cover is maintained closed, means for locking said latch in said second or closed position against movement to said first or open position thereby preventing the inadvertent opening of said cover while a film is mounted within said compartment, and a release distinct from said latch for unlocking said latch-locking means so that said latch may be moved to said first or open position and said cover opened or closed at will.

56. In a camera, a film-receiving compartment for the reception of a magazine, a cover for said compartment, a latch for said cover, a member movable between a first position within said compartment wherein it holds the magazine against movement therewithin and a second position wherein it is without holding effect upon the magazine, and an operating connection between said latch and said holding member for moving said holding member between said positions by the movement of said latch.

57. In a film handling apparatus, a film-receiving compartment adapted for the reception of a magazine, a cover for closing said compartment, a latch for said cover, a holding member movable between a first position wherein it leaves said film-receiving compartment open for the reception of the magazine and a second position wherein it holds the magazine in operative relation to said compartment, and connective mechanism between said latch and said holding member and including devices for concomitantly moving said latch to locking position and said holding member to holding position.

58. In a film handling apparatus, a film-receiving compartment adapted for the reception of a magazine, a cover for closing said compartment, a latch for said cover, a holding member movable between a first position wherein it leaves said film-receiving compartment open for the reception of the magazine and a second position wherein it holds the magazine in operative relation to said compartment, and connective mechanism between said latch and said holding member and including devices for concomitantly moving said latch to unlocking position and moving said holding member from its first or holding position to its second position wherein it leaves said compartment free for the movement of a magazine in relation thereto.

59. In a film handling apparatus adapted for alternative use with a film supported upon a relatively narrow carrier and a film supported upon a relatively wide carrier, a film-receiving compartment, a member bounding said compartment and including an exposure opening, means therewithin for mounting said relatively wide carrier, means therewithin for mounting said relatively narrow carrier, said means for mounting said relatively narrow carrier including a holding member movable from and to a position wherein it holds said narrow carrier in position within said compartment and against movement toward that presently unoccupied portion of said compartment necessary for the accommodation of said relatively wide carrier, a cover for said compartment, a latch for said cover, and an operating connection between said latch and said holding member for moving said holding member by the movement of said latch.

60. In a film handling apparatus adapted for alternative use with a film supported upon a relatively narrow carrier and a film supported upon a relatively wide carrier, a film-receiving compartment, a light tight enclosure therefor, means therewithin for mounting said relatively wide carrier, separate means therewithin for alternatively mounting said relatively narrow carrier, said means for mounting said relatively narrow carrier including a holding member movable between a first position wherein it assists in holding said narrow carrier in operative position within said compartment and against movement toward that presently unoccupied portion of said compartment necessary for the accommodation of said relatively wide carrier and a second position wherein it is without holding effect upon said relatively narrow carrier, a manually operable control member for said holding member operable from the exterior of said enclosure, and operating connections between said control member and said holding member for moving said holding member between said first and second positions by the movement of said control member.

61. In a film handling apparatus, a film-receiving compartment adapted for the reception of a magazine, a sectional gate including a fixed section and a section movable in relation thereto between a first position wherein it is disposed relatively distantly to said fixed section ready for the initial reception of a film housed within said magazine or its removal from the apparatus and a second position wherein it holds a film in operative relation to said fixed section as necessary for the feeding operation thereupon, a holding member movable between a first position wherein it leaves said film-receiving compartment open for the reception of the magazine and a second position wherein it holds the magazine in operative relation to said compartment, and control mechanism operatively interconnecting said movable gate section and said holding member and including devices for concomitantly moving said section and said member from said first positions to said second positions.

62. In a film handling apparatus, a film-receiving compartment adapted for the reception of a magazine, a film guide movable between a first position wherein it is disposed away from the work-path of the film in the apparatus and ready for the initial reception of a film housed within said magazine or its removal from the apparatus and a second position wherein it forms a portion of the work-path of a film in said apparatus, a holding member movable between a first position wherein it leaves said film-receiving compartment open for the reception of the magazine and a second position wherein it holds the magazine in operative relation to said compartment, and control mechanism operatively interconnecting said movable guide and said holding member and including devices for concomitantly moving said guide and said member from said second positions to said first positions.

63. In a film handling apparatus, a film-receiving compartment adapted for the reception of a magazine, an openable gate, operable means for holding the magazine in operative position within said compartment, and control mechanism for said openable gate and said operable holding member, said control mechanism including a single actuating member and connections between said member and said gate and holding member for operating both thereof by said actuating member.

64. In a film handling apparatus, a film-receiving compartment, means for mounting a magazine therewithin, and a cover movable to and from a position wherein it completes the enclosure of said compartment, said mounting means including a unitary spring for engaging the magazine after it has been placed therein and holding it in predetermined position within said compartment, said spring consisting of a supporting portion which is fastened to said apparatus, a holding portion which is movable into contact with said magazine against the tension of the supporting portion, and a camming portion offset from said holding portion and so disposed that it is engaged by said cover as it is being closed and moves said holding portion into holding relation with said magazine, the opening of said cover serving to free said camming portion from contact with said cover whereupon said supporting portion moves said holding portion away from said magazine so that said magazine may be readily removed from said compartment.

65. In a film handling apparatus, a film-receiving compartment, a cover movable from and to a position wherein it completes the enclosure of said compartment, and means for mounting a magazine within said compartment, said mounting means including holding means movable between a first position wherein it engages the magazine to position it within the compartment and a second position wherein it is free of contact with the magazine and disposed without the space within said compartment normally occupied by the magazine, a cam surface engageable by said cover as it is closed and connected to said holding means for moving said holding means from said second to said first position, means for moving said holding means from said second to said first position as the cover is opened, and means for supporting said holding means within said compartment in said positions.

66. In a film handling apparatus, a magazine-receiving compartment, said compartment consisting of relatively immovable bounding portions and a cover movable to and from a position wherein it completes the enclosure formed by said bounding portions, and means for mounting a magazine therewithin, said mounting means including a spring so positioned within said compartment that the movement of said cover to enclosing position brings it into engagement with the magazine, said spring being formed with a first portion which when said cover is closed bears upon the top of the magazine to position it in one plane and a second portion which when said cover is closed bears upon an edge of said magazine substantially normal to said top to position the magazine in another plane whereby a single unitary spring is automatically effective to position the magazine in two planes.

67. In a film handling apparatus adapted for alternative use with two types of film carriers in one of which a film is carried upon open reels and in another of which a film is carried within a magazine, a film-receiving compartment, means for mounting an open reel therewithin, means for alternatively mounting a magazine therewithin, a signal observable from the exterior of the apparatus and movable from one position to another which by its position indicates whether a magazine or an open reel is disposed within said compartment, and means for moving said signal to an appropriate one of said positions by contact with a portion of one of said carriers as it is mounted within said compartment.

68. In a film handling apparatus, a film-receiving compartment, means for mounting a film carrier therewithin, a signal observable from the exterior of the apparatus and movable between two distinct and separate positions in one of which it indicates that said carrier is disposed within said compartment and in the other of which it indicates that said carrier is not disposed therein, a movable actuating member so disposed within said compartment that it is engaged and moved by an exterior portion of said carrier as said carrier is moved relatively to said compartment as when it is being placed therewithin or removed therefrom, and connecting mechanism between said actuating member and said signal for moving said signal from one of said positions to the other thereof by such movement of said carrier thereby operating said signal.

69. In a film handling apparatus, a film-receiving compartment, means for mounting a film carrier therewithin, a signal observable from the exterior of the apparatus and movable between two distinct and separate positions in one of which it indicates that said carrier is disposed within said compartment and in the other of which it indicates that said carrier is not disposed therein, a movable actuating member so disposed within said compartment that it is engaged and moved by an exterior portion of said carrier as said carrier is moved in one direction relatively to said compartment, connecting mechanism between said actuating member and said signal for moving said signal from one of said positions to the other thereof by such movement of said carrier thereby operating said signal, and means for moving said signal to the other of said positions when said carrier is moved in the other of said directions relatively to said compartment.

70. In a film handling apparatus adapted for alternative use with a film housed in a magazine and a film coiled upon open reels, a film-receiving compartment adapted for the alternative reception of said reels and said magazine, said magazine being of a size and shape substantially to fill said film-receiving compartment, a lens, an auxiliary compartment adjacent to and communicating with said film-receiving compartment and into which a film supported in said film-receiving compartment may pass, film-contacting instrumentalities necessary for the handling of a film supported by an open reel but not necessary for a film housed in a magazine, said instrumentalities being housed in said auxiliary compartment, a member projecting within said film-receiving compartment for alternatively cooperating with the film coiled upon open reels and that housed in a magazine when disposed within said film-receiving compartment for determining the focal plane of said lens at which said film is exposed or projected, and a pull-down engaging the film for intermittently advancing said film along said focal plane.

71. In combination, a magazine and a film handling apparatus adapted for alternative use with a film coiled upon open reels and a film housed in the magazine, a film-receiving compartment in said apparatus adapted for the alternative reception of said reels and said magazine, means alternatively effective for mounting the magazine and open reels within said film-receiving compartment; said magazine being of a size and shape substantially to fill said film-receiving compartment and having means for the reception of a pull-down for advancing the film housed therewithin and film-contacting instrumentalities necessary for the handling of a film housed therewithin; an auxiliary compartment adjacent to and communicating with said film-receiving compartment and into which a film mounted upon open reels in said film-receiving compartment may pass, film-contacting instrumentalities necessary for a film supported upon open reels disposed in said auxiliary compartment, film-contacting instrumentalities housed within said film-receiving compartment necessary for cooperating alternatively with a film positioned within said film-receiving compartment coiled upon an open reel when the open reel is mounted within said film-receiving compartment and a film positioned therewithin housed in the magazine when the magazine is mounted in said film-receiving compartment, for determining the focal plane of said lens at which said films are alternatively exposed or projected, and a pull-down alternatively engaging said films for intermittently advancing said films for intermittently advancing said films along said focal plane.

72. In a film handling apparatus adapted for alternative use with films having different characteristics and for their handling within said apparatus demanding film contacting instrumentalities of different characteristics, a film-receiving compartment, supports adapted for the alternative reception of films of each of said different characteristics disposed within said film-receiving compartment, a lens, an auxiliary compartment adjacent to and communicating with said film-receiving compartment into which a film may pass from said film-receiving compartment, film-contacting instrumentalities necessary for the handling of a film of one of said characteristics but not necessary for a film having the other of said characteristics housed within said auxiliary compartment, a member projecting within said film-receiving compartment for alternatively cooperating with a film with either of said characteristics as alternatively disposed within said film-receiving compartment or determining the focal plane of said lens at which said film is exposed or projected, and means alternatively engaging either of said films for alternatively advancing said films along said focal plane.

73. In a film handling apparatus adapted for the alternative reception of films of differing characteristics and for their handling within said apparatus demanding film-contacting instrumentalities of different characteristics, a film-receiving compartment having means for supporting films of either of said characteristics, film-contacting means establishing one path for films of one of said characteristics and another path for films of the other of said characteristics, a lens, a member projecting within said compartment for determining the focal plane of said lens at which the film is exposed or projected, said focal plane forming a portion of each of said paths, an auxiliary compartment disposed adjacent said film-receiving compartment and communicating therewith, film-contacting means disposed within said auxiliary compartment for engaging the film of one of said characteristics and establishing a part of the path therefor but not of the path for the other of said films.

74. In a film handling apparatus adapted for the alternative reception of a film coiled upon an open reel and a film housed within a magazine, a film-receiving compartment, said magazine being of the size and shape approximately to fill said compartment, means within said compartment for alternatively mounting said magazine and open reels therewithin, a lens, a member projecting within said compartment for determining the focal plane of said lens at which the film is exposed or projected, an auxiliary compartment disposed adjacent said film-receiving compartment and communicating therewith, means alternatively engaging a film housed within a magazine and a film coiled upon an open reel for alternatively advancing said films along said focal plane, and means disposed within said auxiliary compartment for engaging the film coiled upon open reels for compensating for the difference in character of movement between the continuously moving portion of the film upon said reels and that being intermittently advanced.

75. In a film handling apparatus adapted for the alternative handling of a film coiled upon open reels and a film housed within a magazine, a film-receiving compartment, means therewithin for supporting an open delivery reel and an open take-up reel between which a film coiled thereupon extends, means within said compartment for mounting a magazine therewithin, said magazine having a delivery support and a take-up support, a pull-down extending within said compartment for alternatively intermittently advacing a film coiled upon open reels and a film housed within a magazine, a recess extending from said compartment at a point relatively adjacent said pull-down, means for compensating for the difference in character of movement of a continuously moving mass of film coiled upon one of said reels and said intermittent pull-down, said compensating means including a film-engaging member and a support therefor, means for bodily moving said support between a first position wherein said film-engaging member is disposed within said compartment and adapted to engage a film extending between open reels, and a second position wherein it is disposed within said recess out of the way of the magazine, an actuating member for said support so disposed that it is engaged and operated by the magazine as it is placed within said compartment, and linkage connecting said actuating member and said support for moving said support upon the actuation of said actuating member.

76. In combination, a film magazine and a film handling apparatus adapted for alternative use with a film housed within a magazine and with one coiled upon open reels, a film-receiving compartment within said apparatus, means for alternatively mounting open reels and a magazine within said compartment, a lens, a member projecting within said compartment for alternatively cooperating with a film coiled upon open reels and one housed within the magazine for determining the focal plane of said lens at which the film is projected or exposed, a pull-down for intermittently advancing the film along said focal plane, and guiding means, certain of said guiding means being mounted within said compartment for determining a first work-path for a film coiled upon open reels which includes said focal plane and others of said guiding means being disposed within said magazine for determining a second work-path for a film housed therewithin, said first and second work-paths being generally different but both including said focal plane, said magazine being of such shape that it does not completely fill said compartment, and said first work-path including guiding means which are disposed within that portion of said compartment which is not occupied by said magazine when it is disposed therewithin.

77. In a film handling apparatus adapted for alternative use with a film housed within a magazine and with one coiled upon open reels, a film-receiving compartment within said apparatus, means for alternatively mounting open reels and a magazine within said compartment, a lens, a member projecting within said compartment for alternatively cooperating with the film coiled upon open reels and with one housed within the magazine for determining the focal plane of said lens at which the film is projected or exposed, a pull-down for intermittently advancing the film along said focal plane, said magazine being of such size and shape that it does not completely fill said compartment and containing therewithin guiding means for the film housed therewithin, and guiding means adapted to cooperate with the film coiled upon open reels and disposed in said compartment in the space which is not occupied by said magazine when it is mounted therewithin.

78. In combination, a magazine and a film handling apparatus adapted for alternative use with a film coiled upon an open reel and a film housed within the magazine, a delivery coil and a take-up coil within said magazine, said take-up coil being adapted to be driven in a given direction, a film-receiving compartment within the apparatus, a delivery spindle for supporting an open reel of film, a take-up spindle for supporting an open reel of film, means for driving said take-up spindle in a direction contrary to that in which said take-up mass within said magazine is adapted to be driven, means within said compartment for driving said take-up mass in said given direction, a support upon which said take-up spindle is bodily movable between a first position within said compartment and a second therewithout, and means operable upon the introduction of the magazine within said compartment for moving said support from said first position to said second position whereby there remains within said compartment only said means for driving said take-up mass of said magazine in said given direction.

79. In combination, a magazine and a film handling apparatus adapted for alternative use with a film coiled upon an open reel and a film housed within the magazine, a delivery coil and a take-up coil within said magazine, said take-up coil being adapted to be driven in a given direction, a film-receiving compartment within the apparatus, a delivery spindle for supporting an open reel of film, a take-up spindle for supporting an open reel of film, said spindle being disposed in said compartment, means for driving said take-up spindle in a direction contrary to said given direction, means within said compartment for driving said take-up coil in said given direction, and means for bodily moving said take-up spindle from said compartment in preparation for the operation therein of said magazine, thereby leaving in said compartment said means for driving said take-up coil of said magazine in said given direction.

80. In combination, a film handling apparatus adapted for alternative use with a first film supported upon open reels and a second film housed within a magazine, the first film being adapted to be wound in a given direction as it is taken up and the second film being adapted to be wound in a contrary direction as it is taken up, a support within said magazine for a delivery coil of the second film housed therewithin, a support within said magazine for the taking up coil of said second film, said second film being adapted to be unwound from said delivery coil in the same direction in which said first film is unwound from said delivery spindle but to be wound upon said take-up support in a direction contrary to that in which the first film is wound upon said take-up spindle of said apparatus, means for supporting said magazine upon the apparatus, a delivery spindle upon the apparatus for supporting said open reel of the first film, a take-up spindle upon the apparatus for supporting an open reel for the reception of the first film, means upon the apparatus and disposed between said spindles and between said supports when said magazine is supported upon said apparatus for alternatively engaging the first film or the second film and establishing a common path through which the first and second films are alternatively advanced, means for alternatively advancing the first or the second film through said path in the same direction, means for driving said take-up spindle in said given direction thereby winding said first film upon an open reel in said given direction, and alternatively effective means independent of said spindle and spaced therefrom for driving said take-up mass in said contrary direction thereby winding the second film upon its support within the magazine in said contrary direction.

81. In a film handling apparatus adapted for alternative use with a film coiled upon an open reel and a film housed within a magazine, said magazine having therewithin a core for a delivery mass of the film housed therewithin, a support for the take-up mass thereof, and means therebetween whereby the film passing between said supports may be engaged by a film-engaging member of said apparatus; said apparatus having means for supporting a delivery reel, means for supporting a take-up reel, means for mounting said magazine, a member adapted alternatively to engage either a film disposed upon open reels or one housed within the magazine, means for feeding either of said films in the same direction past said film-engaging member and alternatively toward said means for supporting a take-up reel or toward the take-up support of said magazine depending upon whether an open reel or said magazine is in use in the apparatus, means effective when open reels are used for rotating said take-up spindle in one direction, means effective when said magazine is mounted upon said apparatus for rotating said take-up support therefor in a direction contrary to that in which said spindle is rotated, and a motion-transmitting connection independent of said spindle and spaced therefrom for connecting said rotating means and said take-up core when said magazine is mounted upon the apparatus, whereby a film supported by open reels and a film housed within a magazine are alternatively fed in the same direction but one is wound after such feeding operation in a direction contrary to that in which the other is wound.

82. In combination, a film handling apparatus adapted for alternative use with a film coiled upon an open reel and a film housed within a magazine, a delivery coil and a take-up coil within the magazine, said take-up coil being adapted to be driven in a given direction, a film-receiving compartment within the apparatus, a delivery spindle for supporting an open reel of film, a take-up spindle for supporting an open reel of film, said spindles being disposed within said compartment, means for supporting said magazine within said compartment, means for driving said take-up spindle in a direction contrary to said given direction, means independent of and spaced from said take-up spindle and within said compartment and engaging said take-up coil of said magazine when said magazine is supported within said compartment for driving said take-up coil in said given direction, and means for rendering one of said driving means ineffective upon a film within said compartment while the other is effective thereupon.

83. In a film handling apparatus which is adapted for alternative use with a first film which is to be drawn from a delivery mass and taken up upon an open reel and a second film which is to be drawn from a delivery mass and taken up upon a core disposed within a magazine; a take-up core within said magazine, means for mounting said magazine upon said apparatus, a gate, a first take-up member disposed within said compartment for supporting an open reel for said first film, a second take-up member distinct from said first take-up member for engaging said take-up core for said second film when said magazine is mounted upon said apparatus, means for alternatively feeding said first film from said gate toward an open reel disposed upon said first take-up member and said second film from said gate toward said take-up core of magazine when said magazine is mounted upon the apparatus and engaged by said second take-up member, a first means for rotating said first take-up member in one direction thereby winding up the film upon said open reel in one direction, a second means for rotating said second take-up member in a contrary direction thereby winding up the film upon the take-up core of said magazine in a direction contrary to that in which the film is wound upon said open reel when said reel is disposed within said compartment, and means operated by the introduction of said magazine within its compartment for rendering the first of said rotating means ineffective.

84. In a film handling apparatus which is adapted for alternative use with a first film which is to be drawn from a delivery mass and taken up upon an open reel and a second film which is to be drawn from a delivery mass and taken up upon a core disposed within a magazine, a take-up core within said magazine, means for mounting said magazine upon said apparatus, a gate, a first take-up member disposed within said compartment, for supporting an open reel for said first film, a second take-up member for engaging and driving said take-up core for said second film when said magazine is mounted upon said apparatus, means for alternatively feeding said first film from said gate toward an open reel disposed upon said first take-up member and said second film from said gate toward said take-up core of the magazine when said magazine is mounted upon the apparatus and engaged by said second take-up member, means for rotating said first take-up member in one direction thereby winding up the film upon said open reel in one direction, and means for rotating said second take-up member in a contrary direction thereby winding up the film upon the take-up core of said magazine in a direction contrary to that in which it is wound upon said open reel.

85. In a film handling apparatus, a first carrier for a first film, a second carrier for a second film, means for alternatively supporting either of said carriers in the apparatus, a first take-up member for engaging said first carrier for winding up the first of said films, a second take-up member for engaging said second carrier for winding up the second of said films, said take-up members being spaced from each other, a common gate, means for alternatively engaging each of said films for feeding it in the same direction through said gate and toward a different one of said take-up members, means for driving one of said take-up members in one direction, means for driving the other of said take-up members in the contrary direction, and means operated by engagement with the first of said carriers upon its introduction into said apparatus and into operative relation with the first of said take-up members for disabling the second of said take-up members.

86. In a film handling apparatus, a film-receiving compartment, a pull-down for intermittently advancing a film positioned therein, and a resilient compensating member cooperating therewith, said compensating member including a guide engaging the film, a pivoted two-part support for said guide, a first part of said support supporting said guide and a second part of said support being pivoted upon said apparatus, a hinge connecting said first part of said support which supports said guide and said second part of said support which is pivoted to said apparatus, the axis of said hinge being normal to that of the pivot for said second part of said support, said first part of said support being movable from a position within said compartment wherein said guide engages the film and a position outside of said compartment wherein said guide clears the film-receiving portion of said compartment, and means for moving said support upon said hinge from one of said positions to the other.

87. In a film handling apparatus, a continuously moving delivery coil and a continuously moving taking-up coil between which a film extends in a line, an apertured member disposed therebetween, a pull-down for intermittently advancing the film from said delivery coil toward said taking-up coil past the aperture of said member, and mechanism for compensating for the difference in character of movement of said delivery coil and said taking-up coil, said compensating mechanism comprising a single unitary leaf spring including a main supporting portion and a terminal film-engaging portion at each end thereof, each of said terminal portions being laterally offset from the main portion connecting said terminal portions and from said line connecting said coils, said connecting portion being attached to said apparatus in such position, at one side of said line, that one of said terminal portions engages the film between said delivery coil and said pull-down and the other of said terminal portions engages the film between said pull-down and said taking-up coil and is disposed out of the way of the film at it passes from one of said coils to the other.

88. In a film handling apparatus, a continuously moving delivery coil and a continuously moving take-up coil between which a film extends, an apertured member disposed between said coils and therewith defining a path for the film between said coils, a pull-down including a member engaging the film within said path for intermittently advancing the film along said path from said delivery coil toward said taking-up coil past the aperture of said member, and mechanism for compensating for the difference in character of movement of said delivery coil and said taking-up coil, said compensating member comprising a single unitary leaf spring including a relatively long main supporting portion and a relatively short terminal film-engaging portion at each end thereof, said terminal portions being laterally offset in a direction normal to the film path from said main portion connecting said terminal portions and said connecting portion being attached to said apparatus adjacent said film path but at one side thereof in such position that one of said terminal offset portions extends to a point adjacent a side of said path for engaging the film between said delivery coil and said pull-down and the other of said terminal portions similarly extends for engaging the film between said pull-down and said taking-up coil.

OLIVER WHITWELL WILSON.
WARREN DUNHAM FOSTER.